United States Patent
Komatsu et al.

(10) Patent No.: US 10,880,473 B2
(45) Date of Patent: Dec. 29, 2020

(54) IMAGING APPARATUS WITH FOCUS BREATHING CORRECTION

(71) Applicant: FUJIFILM Corporation, Tokyo (JP)

(72) Inventors: Daiki Komatsu, Saitama (JP); Yosuke Naruse, Saitama (JP); Kenkichi Hayashi, Saitama (JP); Yoshiaki Ishii, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/549,522

(22) Filed: Aug. 23, 2019

(65) Prior Publication Data
US 2019/0377166 A1    Dec. 12, 2019

Related U.S. Application Data

(63) Continuation of application No. PCT/JP2018/002190, filed on Jan. 25, 2018.

(30) Foreign Application Priority Data

Mar. 14, 2017 (JP) ................................. 2017-048728

(51) Int. Cl.
*H04N 5/232* (2006.01)
*G02B 15/14* (2006.01)
(Continued)

(52) U.S. Cl.
CPC ......... *H04N 5/23229* (2013.01); *G02B 13/18* (2013.01); *G02B 15/144109* (2019.08);
(Continued)

(58) Field of Classification Search
CPC ........ H04N 5/23212–232133; H04N 5/23296; H04N 5/2628; H04N 5/341–347;
(Continued)

(56) References Cited

U.S. PATENT DOCUMENTS

| 6,512,637 B1 | 1/2003 | Tomita |
| 2004/0239785 A1 | 12/2004 | Nanjo et al. |

(Continued)

FOREIGN PATENT DOCUMENTS

| CN | 1533511 A | 9/2004 |
| CN | 1971398 A | 5/2007 |

(Continued)

OTHER PUBLICATIONS

International Preliminary Report on Patentability and Written Opinion of the International Searching Authority(Forms PCT/IB/326, PCT/IB/373 and PCT/ISA/237), dated Sep. 26, 2019, for International Application No. PCT/JP2018/002190, with an English Translation.

(Continued)

*Primary Examiner* — Paul M Berardesca
(74) *Attorney, Agent, or Firm* — Birch, Stewart, Kolasch & Birch, LLP

(57) ABSTRACT

Provided are an imaging apparatus, a signal processing method for an imaging apparatus, and a non-transitory computer readable recording medium storing a signal processing program for an imaging apparatus capable of capturing a high quality image with a compact configuration. An imaging lens 10A is composed of, in order from an object side, a first lens group G1 that is fixed during variable magnification, a second lens group G2 and a third lens group G3 that move during variable magnification, and a fourth lens group G4 that is fixed during variable magnification. The first lens group G1 is composed, in order from the object side, a first-a lens group G1a that is fixed during focusing, a first-b lens group G1b that moves during focusing, and a first lens group rear group G1c that is fixed during focusing. Fluctuation of an angle of view with focusing is corrected through image processing.

6 Claims, 31 Drawing Sheets

(51) Int. Cl.
  *G02B 15/16* (2006.01)
  *G03B 17/14* (2006.01)
  *G03B 3/10* (2006.01)
  *G02B 13/18* (2006.01)
  *H04N 5/225* (2006.01)

(52) U.S. Cl.
  CPC ............... *G02B 15/16* (2013.01); *G03B 3/10* (2013.01); *G03B 17/14* (2013.01); *H04N 5/2254* (2013.01); *H04N 5/23296* (2013.01); *G03B 2205/0046* (2013.01)

(58) Field of Classification Search
  CPC ............... G03B 3/10; G03B 13/32–36; G03B 2205/0046; G02B 7/04–105; G02B 7/28–282; G06T 5/006
  See application file for complete search history.

(56) References Cited

U.S. PATENT DOCUMENTS

| | | | |
|---|---|---|---|
| 2006/0126081 | A1 | 6/2006 | Watanabe et al. |
| 2007/0116382 | A1 | 5/2007 | Gotanda |
| 2010/0007784 | A1 | 1/2010 | Haneda |
| 2013/0229547 | A1* | 9/2013 | Takegawa .......... H04N 5/23212 348/231.99 |
| 2014/0049681 | A1* | 2/2014 | Shimomura .......... G02B 15/17 348/345 |
| 2017/0111588 | A1* | 4/2017 | Krishnamurthy Sagar .................. H04N 5/23296 |
| 2017/0142344 | A1* | 5/2017 | Matsunaga ............... G06T 5/50 |

FOREIGN PATENT DOCUMENTS

| | | |
|---|---|---|
| JP | 11-23949 A | 1/1999 |
| JP | 2001-116993 A | 4/2001 |
| JP | 2002-182302 A | 6/2002 |
| JP | 2003-18449 A | 1/2003 |
| JP | 2006-129211 A | 5/2006 |
| JP | 2007-37176 A | 2/2007 |
| JP | 2008-42405 A | 2/2008 |
| JP | 2008-160622 A | 7/2008 |

OTHER PUBLICATIONS

International Search Report, dated Apr. 24, 2018, for International Appication No. PCT/JP2018/002190, with an English translation.
Chinese Office Action and Search Report, dated Aug. 18, 2020, for corresponding Chinese Application No. 201880016017.2, with English translation of the Chinese Office Action.

* cited by examiner

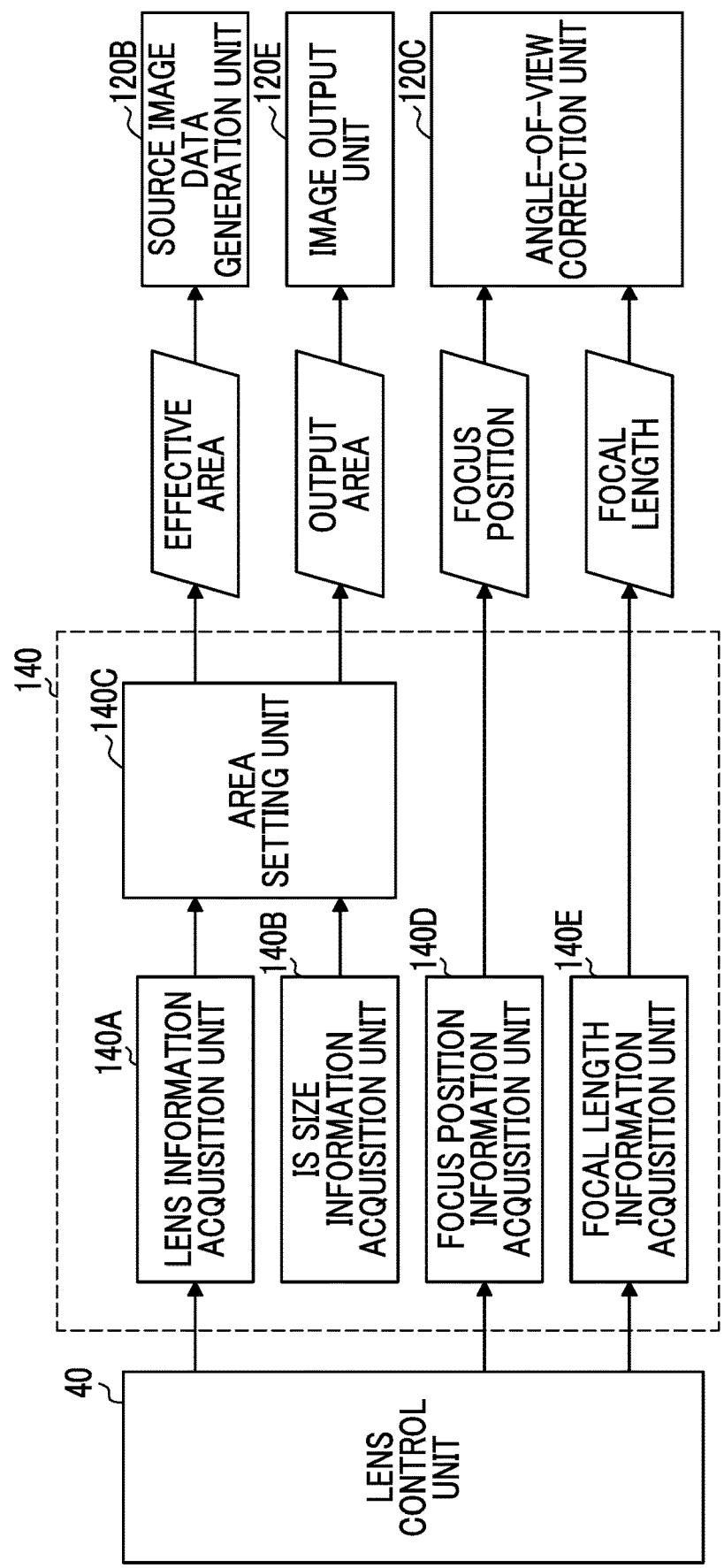

FIG. 19

| <<EXAMPLE 1>> BASIC LENS DATA | | | | | |
|---|---|---|---|---|---|
| SURFACE NUMBER | RADIUS OF CURVATURE | SURFACE DISTANCE | nd | νd | θg, f |
| 1 | 129.8275 | 2.301 | 1.72916 | 54.68 | 0.5445 |
| 2 | 40.9812 | 17.045 | | | |
| 3 | -78.5161 | 1.899 | 1.80400 | 46.58 | 0.5573 |
| 4 | 310.4607 | 0.300 | | | |
| 5 | 98.7224 | 8.699 | 1.80519 | 25.47 | 0.6101 |
| 6 | -436.4264 | 2.020 | | | |
| 7 | 242.6285 | 4.500 | 1.69895 | 30.13 | 0.6030 |
| 8 | 102.3946 | 13.020 | 1.61800 | 63.33 | 0.5441 |
| 9 | -133.3128 | 16.231 | | | |
| 10 | -174.7273 | 2.500 | 1.80610 | 33.27 | 0.5885 |
| 11 | 72.0977 | 9.355 | 1.49700 | 81.54 | 0.5375 |
| 12 | -149.1646 | 0.120 | | | |
| 13 | 150.6362 | 7.959 | 1.61800 | 63.33 | 0.5441 |
| 14 | -100.3941 | 0.120 | | | |
| 15 | 84.7465 | 3.051 | 1.80610 | 33.27 | 0.5885 |
| 16 | 150.9138 | DD[16] | | | |
| *17 | 60.5194 | 3.000 | 1.74000 | 28.30 | 0.6079 |
| 18 | 29.6168 | 7.219 | | | |
| 19 | -102.5590 | 1.698 | 1.43875 | 94.94 | 0.5343 |
| 20 | 35.3268 | 5.813 | 1.80519 | 25.47 | 0.6101 |
| 21 | 351.6145 | 4.211 | | | |
| 22 | -47.7330 | 1.000 | 1.75520 | 27.51 | 0.6103 |
| 23 | -84.1946 | DD[23] | | | |
| 24 | -56.6635 | 1.233 | 1.43875 | 94.94 | 0.5343 |
| 25 | -407.9729 | DD[25] | | | |
| 26 (STOP) | ∞ | 2.300 | | | |
| 27 | 641.2849 | 2.698 | 1.62041 | 60.29 | 0.5427 |
| 28 | -110.6581 | 0.120 | | | |
| 29 | 43.3854 | 4.481 | 1.84139 | 24.56 | 0.6127 |
| 30 | 701.4869 | 0.119 | | | |
| 31 | 32.6973 | 7.156 | 1.43875 | 94.94 | 0.5343 |
| 32 | -82.7464 | 1.390 | 1.88300 | 40.76 | 0.5668 |
| 33 | 32.3832 | 1.573 | | | |
| 34 | 29.0742 | 12.701 | 1.49700 | 81.54 | 0.5375 |
| 35 | -56.9948 | 0.120 | | | |
| 36 | 55.6286 | 1.199 | 1.84666 | 23.78 | 0.6205 |
| 37 | 17.0430 | 6.210 | 1.51633 | 64.14 | 0.5353 |
| 38 | -515.6505 | 1.941 | | | |
| 39 | -36.6382 | 1.209 | 1.59551 | 39.24 | 0.5804 |
| 40 | 20.5865 | 9.769 | 1.51633 | 64.14 | 0.5353 |
| 41 | -20.5865 | 0.281 | | | |
| 42 | -19.4934 | 1.099 | 1.51742 | 52.43 | 0.5565 |
| 43 | 32.5348 | 6.126 | | | |
| 44 | 52.2490 | 4.845 | 1.84139 | 24.56 | 0.6127 |
| 45 | -102.7850 | 0.500 | | | |
| 46 | ∞ | 2.000 | 1.51632 | 64.05 | 0.5364 |
| 47 | ∞ | 10.000 | | | |
| 48 | ∞ | 2.490 | 1.51632 | 64.05 | 0.5364 |
| 49 | ∞ | 25.488 | | | |

FIG. 20

| <<EXAMPLE 1>> SPECIFICATIONS (d LINE) | | | |
|---|---|---|---|
|  | WIDE ANGLE | MIDDLE | TELEPHOTO |
| ZOOM MAGNIFICATION | 1.00 | 2.15 | 2.61 |
| f' | 29.97 | 64.43 | 78.22 |
| Bf' | 37.13 | 37.13 | 37.13 |
| FNo. | 2.65 | 2.65 | 2.65 |
| 2ω[°] | 56.2 | 26.6 | 22.0 |

FIG. 21

| <<EXAMPLE 1>> ZOOM DISTANCES | | | |
|---|---|---|---|
| DD[16] | 1.000 | 45.761 | 54.412 |
| DD[23] | 42.684 | 4.949 | 3.402 |
| DD[25] | 15.650 | 8.624 | 1.520 |

FIG. 22

| «EXAMPLE 1» ASPHERIC COEFFICIENTS | |
|---|---|
| SURFACE NUMBER | 17 |
| KA | 1.00000000E+00 |
| A4 | 4.70730444E−07 |
| A6 | 4.22922572E−09 |
| A8 | −5.75102680E−11 |
| A10 | 4.94984977E−13 |
| A12 | −2.59586442E−15 |
| A14 | 8.31397563E−18 |
| A16 | −1.58032348E−20 |
| A18 | 1.63032141E−23 |
| A20 | −6.98417756E−27 |

FIG. 23
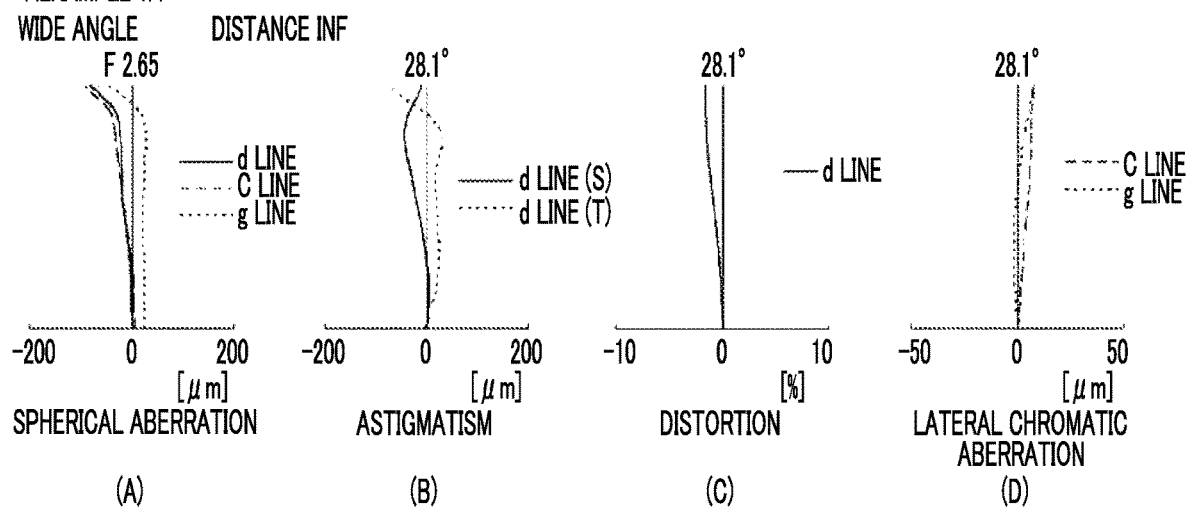
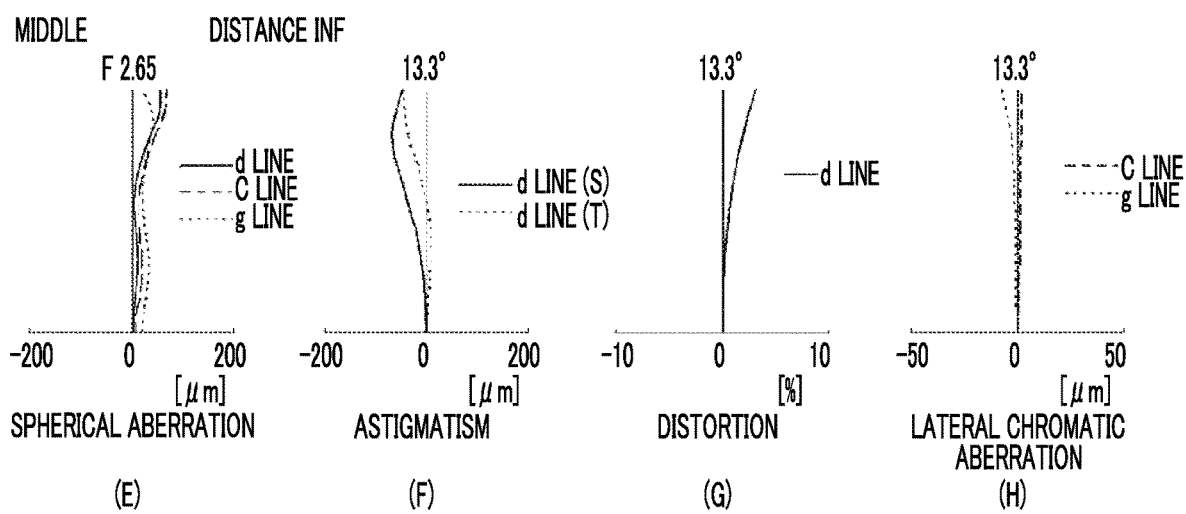
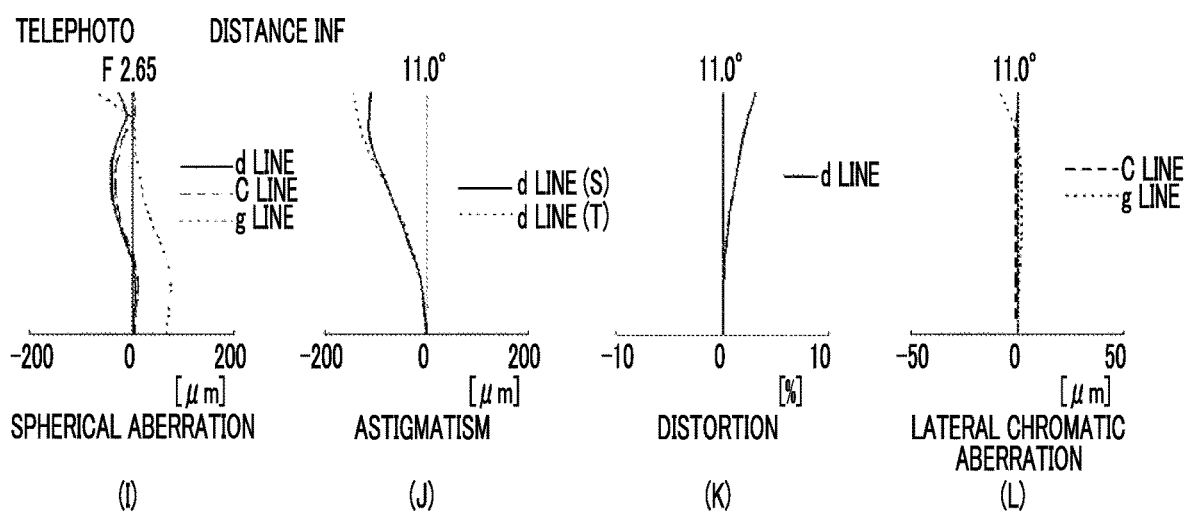

FIG. 24

| <<EXAMPLE 2>> BASIC LENS DATA | | | | | |
|---|---|---|---|---|---|
| SURFACE NUMBER | RADIUS OF CURVATURE | SURFACE DISTANCE | nd | νd | θg,f |
| 1 | 133.6488 | 3.200 | 1.80610 | 40.93 | 0.5702 |
| 2 | 92.2953 | 1.565 | | | |
| 3 | 94.9011 | 13.000 | 1.49700 | 81.54 | 0.5375 |
| 4 | -1208.8043 | 17.507 | | | |
| 5 | 114.1607 | 3.200 | 1.80518 | 25.42 | 0.6162 |
| 6 | 80.0411 | 13.000 | 1.49700 | 81.54 | 0.5375 |
| 7 | 7059.3134 | 0.500 | | | |
| 8 | 136.7268 | 7.308 | 1.49700 | 81.54 | 0.5375 |
| 9 | 3178.7987 | DD[9] | | | |
| *10 | -205.9720 | 2.500 | 1.51633 | 64.14 | 0.5353 |
| 11 | 85.9239 | 2.781 | | | |
| 12 | 138.7185 | 7.891 | 1.80518 | 25.43 | 0.6103 |
| 13 | -91.1360 | 2.500 | 1.80610 | 33.27 | 0.5885 |
| 14 | 136.7288 | DD[14] | | | |
| 15 | 7941.7010 | 2.000 | 1.69680 | 55.53 | 0.5434 |
| 16 | 30.4284 | 5.508 | 1.80518 | 25.43 | 0.6103 |
| 17 | 85.8581 | 3.488 | | | |
| 18 | -107.8654 | 1.700 | 1.80400 | 46.58 | 0.5573 |
| 19 | 1141.9846 | 1.700 | 1.80518 | 25.42 | 0.6162 |
| 20 | 142.2994 | DD[20] | | | |
| 21 | 531.1028 | 3.609 | 1.71300 | 53.87 | 0.5459 |
| 22 | -129.4548 | 0.200 | | | |
| 23 | 41.3487 | 7.543 | 1.61800 | 63.33 | 0.5441 |
| 24 | 45794.7189 | 0.200 | | | |
| 25 | 36.3409 | 9.000 | 1.49700 | 81.54 | 0.5375 |
| 26 | -258.1964 | 1.700 | 1.80000 | 29.84 | 0.6018 |
| 27 | 62.6014 | 5.010 | | | |
| 28 (STOP) | ∞ | 3.894 | | | |
| 29 | 910.2502 | 3.159 | 1.80610 | 40.93 | 0.5702 |
| 30 | -153.8772 | 1.500 | 1.80518 | 25.42 | 0.6162 |
| 31 | 26.4404 | 9.551 | | | |
| 32 | 81.1541 | 8.085 | 1.84666 | 23.88 | 0.6218 |
| 33 | -21.3715 | 1.498 | 1.80400 | 46.58 | 0.5573 |
| 34 | -607.4468 | 0.200 | | | |
| 35 | 46.3086 | 11.552 | 1.49700 | 81.54 | 0.5375 |
| 36 | -55.3757 | 1.700 | 1.80518 | 25.42 | 0.6162 |
| 37 | 48.0952 | 15.244 | | | |
| 38 | 44.4617 | 6.443 | 1.51633 | 64.14 | 0.5353 |
| 39 | -168.2640 | 28.000 | | | |
| 40 | ∞ | 2.300 | 1.51633 | 64.14 | 0.5353 |
| 41 | ∞ | DD[41] | | | |

FIG. 25

| <<EXAMPLE 2>> SPECIFICATIONS (d LINE) | | | |
|---|---|---|---|
| | WIDE ANGLE | MIDDLE | TELEPHOTO |
| ZOOM MAGNIFICATION | 1.00 | 2.74 | 3.41 |
| f' | 86.53 | 237.08 | 295.05 |
| Bf' | 36.05 | 36.05 | 36.05 |
| FNo. | 2.69 | 2.96 | 3.74 |
| $2\omega[°]$ | 21.2 | 7.6 | 6.0 |

FIG. 26

| <<EXAMPLE 2>> ZOOM DISTANCES | | | |
|---|---|---|---|
| DD[9] | 5.192 | 21.282 | 20.400 |
| DD[14] | 4.070 | 30.593 | 44.113 |
| DD[20] | 59.013 | 16.400 | 3.761 |
| DD[41] | 6.537 | 6.537 | 6.537 |

FIG. 27

| <<EXAMPLE 2>> ASPHERIC COEFFICIENTS | |
|---|---:|
| SURFACE NUMBER | 10 |
| KA | -3.47725807E+01 |
| A3 | 0.00000000E+00 |
| A4 | -2.07385118E-07 |
| A5 | -4.51257395E-09 |
| A6 | 6.46076819E-10 |
| A7 | -1.90696693E-11 |
| A8 | -2.90106480E-13 |
| A9 | 4.36145926E-14 |
| A10 | -9.43293788E-16 |
| A11 | -1.04641765E-17 |
| A12 | 4.06202156E-19 |
| A13 | 0.00000000E+00 |
| A14 | 0.00000000E+00 |
| A15 | 0.00000000E+00 |
| A16 | 0.00000000E+00 |

FIG. 28
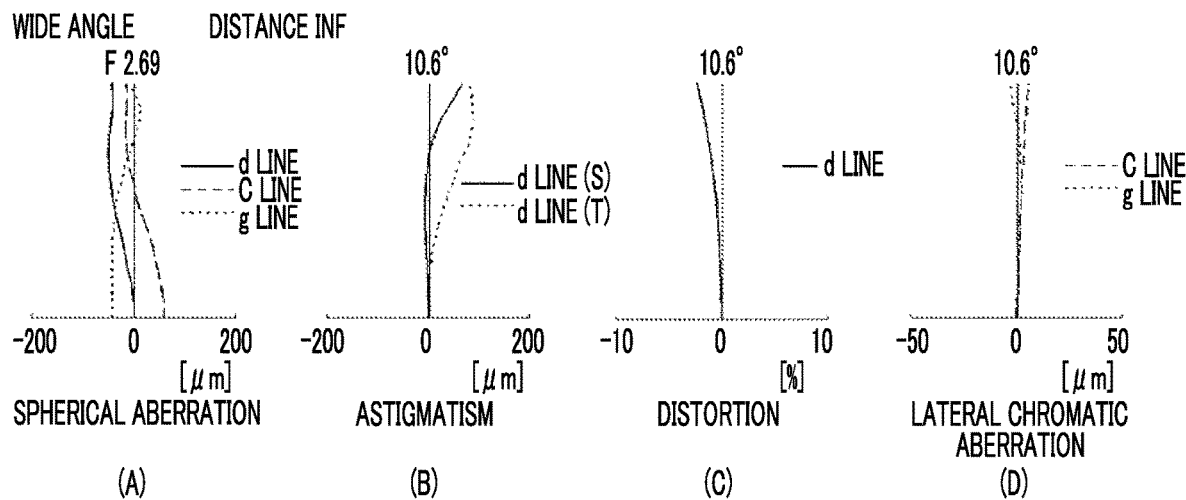
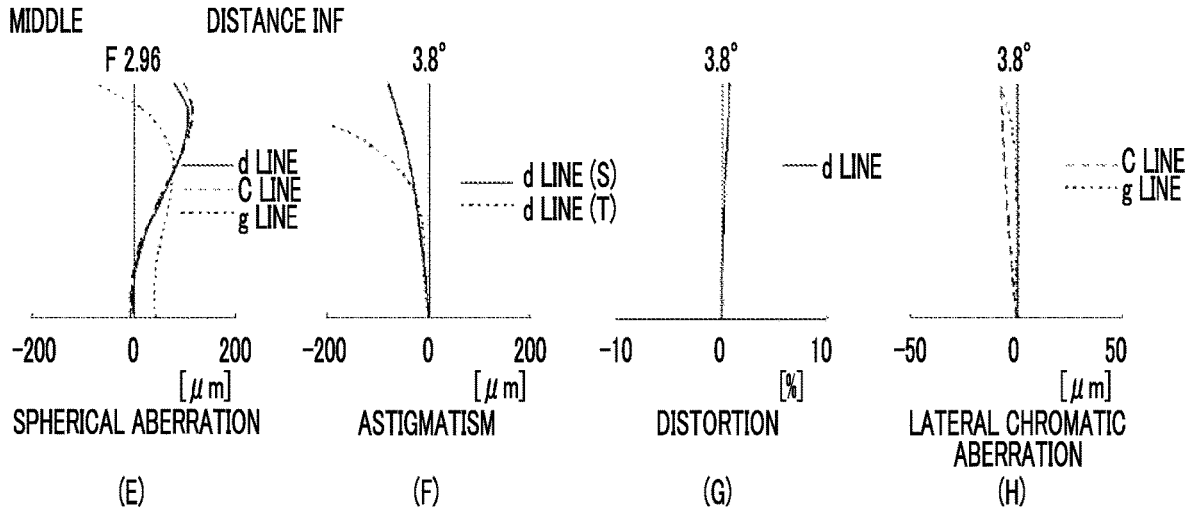
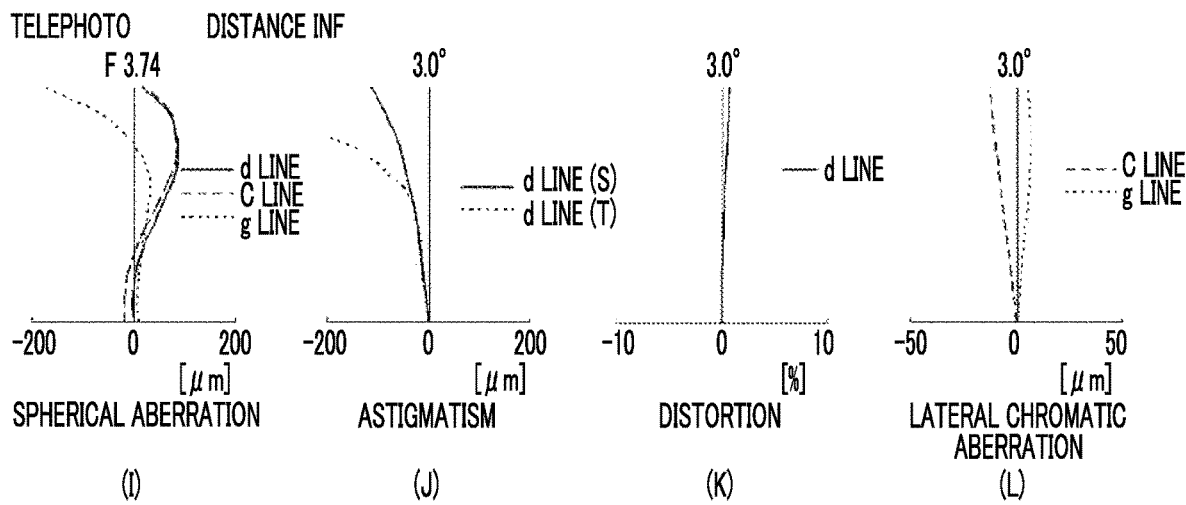

FIG. 29

| «EXAMPLE 3» BASIC LENS DATA | | | | | |
|---|---|---|---|---|---|
| SURFACE NUMBER | RADIUS OF CURVATURE | SURFACE DISTANCE | nd | νd | θg,f |
| *1 | 1000.3969 | 4.657 | 1.58313 | 59.37 | 0.5435 |
| 2 | 32.0640 | 16.765 | | | |
| *3 | 87.6487 | 3.001 | 1.77250 | 49.60 | 0.5521 |
| 4 | 33.2740 | 13.394 | | | |
| 5 | -67.9605 | 2.240 | 1.88300 | 40.80 | 0.5656 |
| 6 | 106.5356 | 3.993 | 1.80518 | 25.42 | 0.6162 |
| 7 | 3620.7199 | 4.584 | | | |
| 8 | 107.4152 | 8.686 | 1.63980 | 34.47 | 0.5923 |
| 9 | -104.1421 | 11.779 | | | |
| 10 | 2846.4894 | 9.770 | 1.51742 | 52.43 | 0.5565 |
| 11 | -50.1561 | 3.159 | 1.80518 | 25.42 | 0.6162 |
| 12 | -95.0393 | 0.151 | | | |
| 13 | 146.0783 | 2.700 | 1.88300 | 40.80 | 0.5656 |
| 14 | 57.5738 | 11.578 | 1.49700 | 81.54 | 0.5375 |
| 15 | -113.9410 | 3.901 | | | |
| 16 | -493.7183 | 5.709 | 1.49700 | 81.54 | 0.5375 |
| 17 | -69.0137 | 0.149 | | | |
| 18 | 138.9793 | 3.774 | 1.43875 | 94.94 | 0.5343 |
| 19 | -1007.5617 | DD[19] | | | |
| 20 | 46.6172 | 3.691 | 1.49700 | 81.54 | 0.5375 |
| 21 | 34.0889 | 4.872 | | | |
| 22 | -238.0141 | 1.201 | 1.83400 | 37.16 | 0.5776 |
| 23 | 40.4206 | DD[23] | | | |
| 24 | 46.7076 | 3.449 | 1.80518 | 25.42 | 0.6162 |
| 25 | 288.1627 | DD[25] | | | |
| 26 | -61.3160 | 1.200 | 1.60300 | 65.44 | 0.5402 |
| 27 | 49.5376 | 2.724 | 1.80000 | 29.84 | 0.6018 |
| 28 | 205.3737 | DD[28] | | | |
| 29 (STOP) | ∞ | 1.299 | | | |
| 30 | 92.1005 | 4.001 | 1.80100 | 33.98 | 0.5892 |
| 31 | -205.6626 | 0.151 | | | |
| 32 | 43.3092 | 9.066 | 1.61694 | 63.54 | 0.5370 |
| 33 | -34.3769 | 1.201 | 1.90401 | 31.07 | 0.5956 |
| 34 | 102.6322 | 11.162 | | | |
| 35 | 95.0290 | 3.782 | 1.90366 | 31.31 | 0.5948 |
| 36 | -60.9770 | 4.450 | | | |
| 37 | 28.8352 | 6.045 | 1.49700 | 81.54 | 0.5375 |
| 38 | -46.9946 | 1.201 | 1.88100 | 40.14 | 0.5701 |
| 39 | 24.1086 | 5.801 | | | |
| 40 | 54.2430 | 7.599 | 1.48749 | 70.24 | 0.5301 |
| 41 | -20.6330 | 1.201 | 1.91082 | 35.25 | 0.5822 |
| 42 | 374.5235 | 2.841 | | | |
| 43 | 93.6249 | 6.265 | 1.48749 | 70.24 | 0.5301 |
| 44 | -28.6079 | 0.000 | | | |
| 45 | ∞ | 2.300 | 1.51633 | 64.14 | 0.5353 |
| 46 | ∞ | DD[46] | | | |

FIG. 30

| <<EXAMPLE 3>> SPECIFICATIONS (d LINE) | | | |
|---|---|---|---|
| | WIDE ANGLE | MIDDLE | TELEPHOTO |
| ZOOM MAGNIFICATION | 1.00 | 2.01 | 2.40 |
| f' | 14.50 | 29.15 | 34.81 |
| Bf' | 33.97 | 33.97 | 33.97 |
| FNo. | 2.76 | 2.76 | 2.76 |
| 2ω[°] | 97.0 | 55.6 | 47.6 |

FIG. 31

| <<EXAMPLE 3>> ZOOM DISTANCES | | | |
|---|---|---|---|
| DD[19] | 1.500 | 41.530 | 49.080 |
| DD[23] | 2.596 | 2.780 | 2.452 |
| DD[25] | 27.138 | 3.857 | 3.873 |
| DD[28] | 26.616 | 9.682 | 2.444 |
| DD[46] | 32.456 | 32.456 | 32.456 |

FIG. 32

| <<EXAMPLE 3>> ASPHERIC COEFFICIENTS | |
|---|---|
| SURFACE NUMBER | 1 |
| KA | 1.00000000E+00 |
| A3 | -5.67387794E-06 |
| A4 | 5.97772705E-06 |
| A5 | -4.46956571E-08 |
| A6 | -1.87803862E-09 |
| A7 | 9.64919317E-12 |
| A8 | 1.04253818E-12 |
| A9 | -1.37674325E-17 |
| A10 | -2.87304279E-16 |
| A11 | -6.47733381E-19 |
| A12 | 2.76631449E-20 |
| A13 | 1.34435231E-22 |
| A14 | 6.43478346E-24 |
| A15 | 1.18909449E-25 |
| A16 | 9.46911671E-28 |
| A17 | -2.88016470E-29 |
| A18 | -1.16646348E-30 |
| A19 | -6.22680274E-33 |
| A20 | 1.72742158E-33 |

| SURFACE NUMBER | 3 |
|---|---|
| KA | 1.00000000E+00 |
| A4 | -4.27638094E-06 |
| A6 | -3.54750288E-09 |
| A8 | 1.80665658E-11 |
| A10 | -5.56461513E-14 |
| A12 | 1.15768315E-16 |
| A14 | -1.53616312E-19 |
| A16 | 1.23069893E-22 |
| A18 | -5.50509877E-26 |
| A20 | 1.12290856E-29 |

FIG. 33
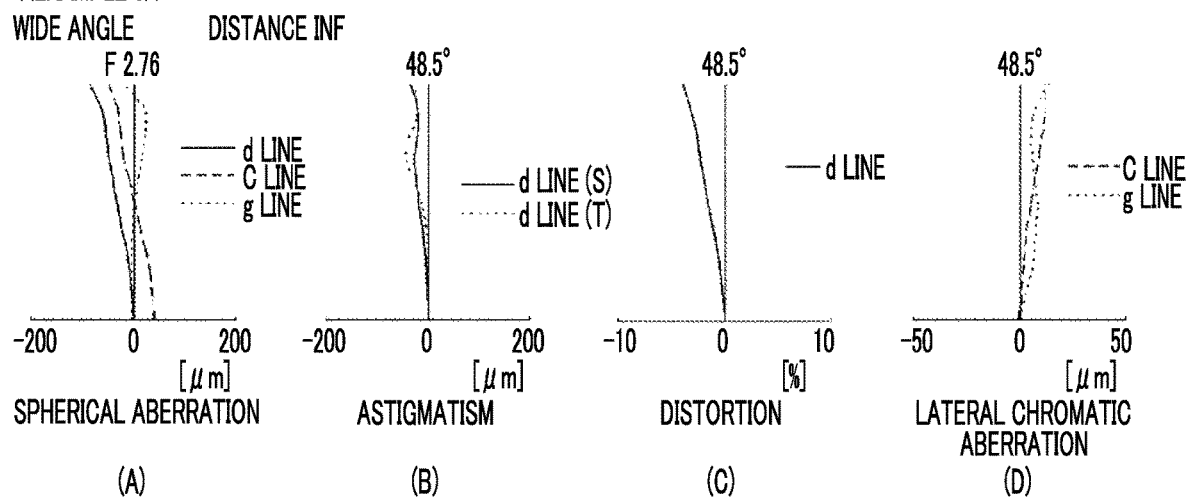
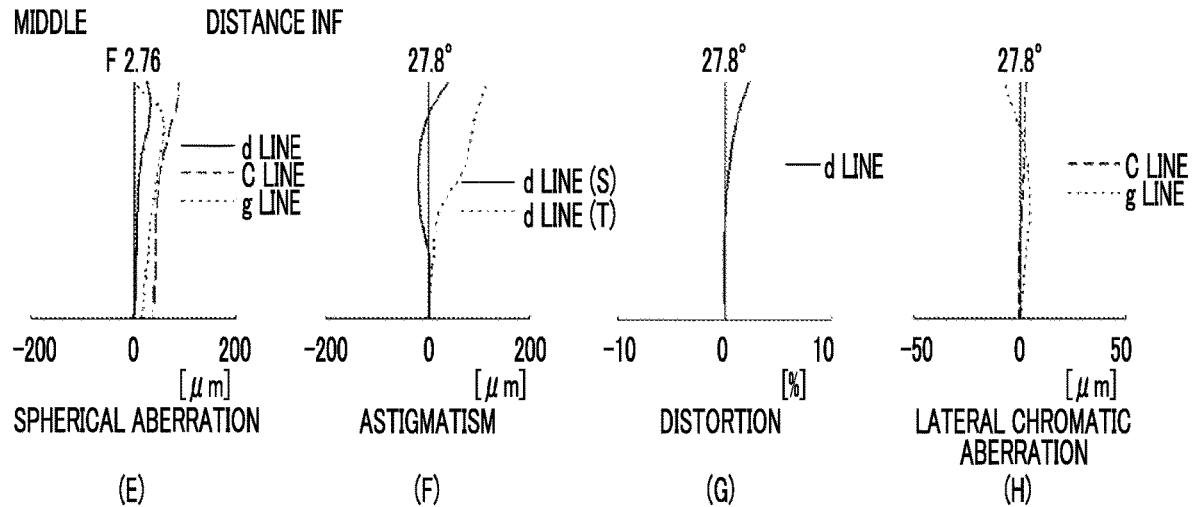
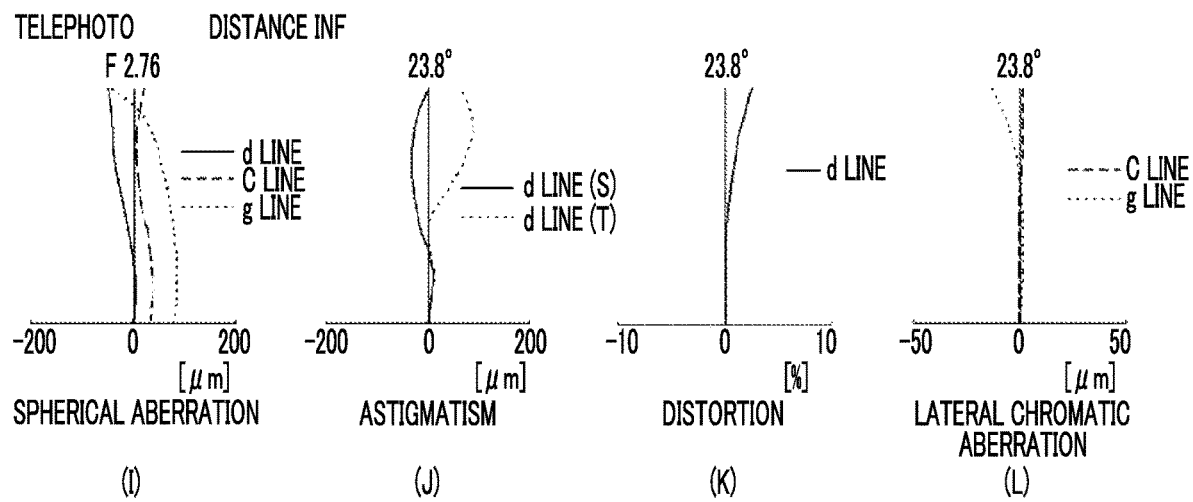

FIG. 34

| | COMPARATIVE EXAMPLE 1 | COMPARATIVE EXAMPLE 2 | EXAMPLE 1 | EXAMPLE 2 | EXAMPLE 3 |
|---|---|---|---|---|---|
| LENS CONFIGURATION | P–P | P–P | P–P | P–P | P–+–P |
| FIRST LENS GROUP CONFIGURATION | NEGATIVE, POSITIVE, POSITIVE | NEGATIVE, POSITIVE | NEGATIVE, POSITIVE, POSITIVE | NEGATIVE, POSITIVE | NEGATIVE, POSITIVE, POSITIVE |
| WEIGHT | BAD | GOOD | BAD | GOOD | BAD |
| DESIGN DISTANCE PERFORMANCE | GOOD | GOOD | VERY GOOD | GOOD | VERY GOOD |
| DISTANCE FLUCTUATION | GOOD | BAD | GOOD | BAD | GOOD |
| FOCUS BREATHING AMOUNT | GOOD | BAD | BAD (DESIGN VALUE) → GOOD (APPLICATION OF THE INVENTION) | BAD (DESIGN VALUE) → GOOD (APPLICATION OF THE INVENTION) | BAD (DESIGN VALUE) → GOOD (APPLICATION OF THE INVENTION) |

IMAGING APPARATUS WITH FOCUS BREATHING CORRECTION

CROSS-REFERENCE TO RELATED APPLICATIONS

This application is a Continuation of PCT International Application No. PCT/JP2018/002190 filed on Jan. 25, 2018, which claims priority under 35 U.S.C § 119(a) to Japanese Patent Application No. 2017-048728 filed on Mar. 14, 2017. Each of the above application(s) is hereby expressly incorporated by reference, in its entirety, into the present application.

BACKGROUND OF THE INVENTION

1. Field of the Invention

The present invention relates to an imaging apparatus, a signal processing method for an imaging apparatus, and a non-transitory computer readable recording medium storing a signal processing program for an imaging apparatus, and in particular, an imaging apparatus, a signal processing method for an imaging apparatus, and a non-transitory computer readable recording medium storing a signal processing program for an imaging apparatus that correct focus breathing through image processing.

2. Description of the Related Art

As one of problems in a zoom lens, focus breathing is known. Focus breathing refers to a phenomenon that an angle of view fluctuates accompanied by focusing. The fluctuation of the angle of view causes fluctuation of an imaging range.

In JP1999-023949A (JP-H11-023949), JP2008-042405A, JP2008-160622A, JP2002-182302A, and JP2006-129211A, a technique that corrects focus breathing through image processing has been suggested. In JP1999-023949A (JP-H11-023949), JP2008-042405A, JP2008-160622A, JP2002-182302A, and JP2006-129211A, focus breathing is corrected by subjecting image data obtained by imaging to magnification and reduction processing (also referred to as electronic zoom, digital zoom, or the like).

SUMMARY OF THE INVENTION

However, in the related art, since focus breathing is simply corrected through the image processing, in a case where an imaging apparatus including an imaging lens is taken as a whole, the apparatus cannot be appropriately configured.

The invention has been accomplished in consideration of such a situation, and an object of the invention is to provide an imaging apparatus, a signal processing method for an imaging apparatus, and a non-transitory computer readable recording medium storing a signal processing program for an imaging apparatus capable of capturing a high quality image with a compact configuration.

Means for solving the above-described problem is as follows.

(1) An imaging apparatus comprising a zoom lens comprising, in order from an object side, a first lens group that is fixed during variable magnification, a plurality of movable lens groups that move during variable magnification, and a final lens group that is fixed during variable magnification, the first lens group comprising, in order from the object side, a first-a lens group that is fixed during focusing and a first-b lens group that moves during focusing, an image sensor that captures an image formed by the zoom lens, a source image data generation unit that processes a signal output from the image sensor to generate source image data, the signal being output from an effective area set as an area where a normal image is to be captured, an image output unit that extracts and outputs image data of an output area set within the effective area from the source image data, and an angle-of-view correction unit that subjects the source image data to magnification and reduction processing to correct an angle of view of the image data of the output area, and in a case where the angle of view of the image data of the output area fluctuates with focusing, subjects the source image data to the magnification and reduction processing in conjunction with focusing and corrects the angle of view of the image data of the output area to a reference angle of view determined for each focal length.

According to the aspect, the zoom lens comprises, in order from the object side, the first lens group that is fixed during variable magnification, a plurality of movable lens groups that move during variable magnification, and the final lens group that is fixed during variable magnification. The first lens group comprises, in order from the object side, the first-a lens group that is fixed during focusing, and the first-b lens group that moves during focusing. With this, it is possible to configure the zoom lens with an unchanged total length through a focus operation and a variable magnification operation. It is also possible to simplify the configuration of the first lens group and to achieve reduction in weight and compactness of the zoom lens.

While focus breathing is caused by configuring the zoom lens in this way, focus breathing is corrected through image processing. That is, the source image data is subjected to magnification and reduction processing in conjunction with focusing, and fluctuation of the angle of view accompanied by focusing is corrected. The magnification and reduction processing is processing for magnifying or reducing image data through image processing, and is referred to as electronic beam, digital beam, or the like. The angle of view is corrected to the reference angle of view determined for each focal length. With this, even though a focus operation is performed at each focal length, the angle of view is maintained constant, and it is possible to acquire a high quality image.

The angle of view is corrected to the angle of view of the output area. The output area is an area that is output as a captured image, and is set within the effective area. The effective area is an area where a normal image is to be captured with the image sensor. The effective area is set by an effective pixel area of the image sensor and an image circle of the zoom lens. The effective pixel area of the image sensor is an area in the image sensor where an image is actually to be captured. In a case where the size of the image circle of the zoom lens is greater than the effective pixel area of the image sensor, the effective area is to coincide with the effective pixel area. The output area may be made to coincide with the effective area.

(2) The imaging apparatus of (1), in which the reference angle of view is set to a minimum angle of view out of the angle of view of the image data of the output area fluctuating with focusing at each focal length, and the angle-of-view correction unit corrects the angle of view of the image data of the output area through magnification processing.

According to the aspect, the reference angle of view is set to the minimum angle of view out of the angle of view fluctuating with focusing. The "minimum angle of view"

also includes a near angle of view. That is, the "minimum angle of view" is a concept including an angle of view within a range to be regarded as a minimum. The angle-of-view correction unit corrects the angle of view through the magnification processing. For example, in a case where the output area coincides with the effective area, or the like, as in the aspect, the angle of view is corrected through the magnification processing, and focus breathing is corrected.

(3) The imaging apparatus of (1), in which the reference angle of view is set to a maximum angle of view out of the angle of view of the image data of the output area fluctuating with focusing at each focal length, and the angle-of-view correction unit corrects the angle of view of the image data of the output area through reduction processing.

According to the aspect, the reference angle of view is set to the maximum angle of view out of the angle of view fluctuating with focusing. The "maximum angle of view" also includes a near angle of view. That is, the "maximum angle of view" is a concept including an angle of view within a range to be regarded as a maximum. The angle-of-view correction unit corrects the angle of view through the reduction processing. For example, in a case where the output area is set within the effective area, or the like, there is a blank area around the output area. In such a case, the angle of view is corrected through the magnification processing, and focus breathing is corrected.

(4) The imaging apparatus of (1), in which the reference angle of view is set to a minimum angle of view out of the angle of view of the effective area fluctuating with focusing at each focal length, and the angle-of-view correction unit corrects the angle of view of the image data of the output area through reduction processing in a case where the angle of view of the image data of the output area is reduced smaller than the reference angle of view with focusing, and corrects the angle of view of the image data of the output area through magnification processing in a case where the angle of view of the image data of the output area is magnified greater than the reference angle of view with focusing.

According to the aspect, the reference angle of view is set to the minimum angle of view out of the angle of view of the effective area fluctuating with focusing. The angle-of-view correction unit corrects the angle of view of the image data of the output area through the reduction processing in a case where the angle of view of the image data of the output area is reduced smaller than the reference angle of view with focusing. The angle-of-view correction unit corrects the angle of view of the image data of the output area through the magnification processing in a case where the angle of view of the image data of the output area is magnified greater than the reference angle of view with focusing. With this, for example, in a case where the output area is set within the effective area, it is possible to correct focus breathing through the reduction processing as much as possible. While the correction through the magnification processing causes degradation of image quality, such as deterioration of a modulation transfer function (MTF), the correction through the reduction processing can restrain degradation of image quality. Accordingly, it is possible to correct focus breathing through the reduction processing as much as possible, whereby it is possible to restrain degradation of image quality. The "minimum angle of view" also includes a near angle of view. That is, the "minimum angle of view" is a concept including an angle of view within a range to be regarded as a minimum.

(5) The imaging apparatus of any one of (1) to (4), in which the zoom lens further comprises an imaging apparatus information acquisition unit that acquires information regarding a size of the image sensor from an imaging apparatus body in which the zoom lens is mounted, and an area setting unit that sets the effective area and the output area based on information regarding a size of an image circle of the zoom lens and information regarding the size of the image sensor.

According to the aspect, the effective area and the output area are automatically set on the zoom lens side based on information regarding the size of the image circle of the zoom lens and information regarding the size of the image sensor. The size of the image sensor is the size of the effective pixel area of the image sensor.

(6) The imaging apparatus of any one of (1) to (4), further comprising, in a case where the zoom lens is interchangeable, a lens information acquisition unit that acquires information regarding a size of an image circle from the mounted zoom lens, and an area setting unit that sets the effective area and the output area based on information regarding to the size of the image circle of the mounted zoom lens and information regarding a size of the image sensor.

According to the aspect, the effective area and the output area are automatically set based on information regarding the size of the image circle of the zoom lens and information regarding the size of the image sensor.

(7) A signal processing method for an imaging apparatus, in which the imaging apparatus comprises a zoom lens comprising, in order from an object side, a first lens group that is fixed during variable magnification, a plurality of movable lens groups that move during variable magnification, and a final lens group that is fixed during variable magnification, the first lens group comprising, in order from the object side, a first-a lens group that is fixed during focusing and a first-b lens group that moves during focusing, and an image sensor that captures an image formed by the zoom lens, and the signal processing method comprises a step of processing a signal output from the image sensor to generate source image data, the signal being output from an effective area set as an area where a normal image is to be captured, a step of extracting and outputting image data of an output area set within the effective area from the source image data, and a step of subjecting the source image data to magnification and reduction processing to correct an angle of view of the image data of the output area, and in a case where the angle of view of the image data of the output area fluctuates with focusing, subjecting the source image data to the magnification and reduction processing in conjunction with focusing and correcting the angle of view of the image data of the output area to a reference angle of view determined for each focal length.

According to the aspect, the zoom lens comprises, in order from the object side, the first lens group that is fixed during variable magnification, a plurality of movable lens groups that move during variable magnification, and the final lens group that is fixed during variable magnification. The first lens group comprises, in order from the object side, the first-a lens group that is fixed during focusing, and the first-b lens group that moves during focusing. In a case where the angle of view of the image data of the output area fluctuates with a focus operation, the angle of view is corrected by subjecting the source image data to the magnification and reduction processing. The angle of view is corrected to the reference angle of view determined for each focal length.

(8) A non-transitory computer readable recording medium storing a signal processing program for an imaging apparatus, in which the imaging apparatus comprises a zoom lens comprising, in order from an object side, a first lens group that is fixed during variable magnification, a plurality of movable lens groups that move during variable magnification, and a final lens group that is fixed during variable magnification, the first lens group comprising, in order from the object side, a first-a lens group that is fixed during focusing and a first-b lens group that moves during focusing, and an image sensor that captures an image formed by the zoom lens, and the signal processing program causes a computer to implement a function of processing a signal output from the image sensor to generate source image data, the signal being output from an effective area set as an area where a normal image is to be captured, a function of extracting and outputting image data of an output area set within the effective area from the source image data, and a function of subjecting the source image data to magnification and reduction processing to correct an angle of view of the image data of the output area, and in a case where the angle of view of the image data of the output area fluctuates with focusing, subjecting the source image data to the magnification and reduction processing in conjunction with focusing and correcting the angle of view of the image data of the output area to a reference angle of view determined for each focal length.

According to the aspect, the zoom lens comprises, in order from the object side, the first lens group that is fixed during variable magnification, a plurality of movable lens groups that move during variable magnification, and the final lens group that is fixed during variable magnification. The first lens group comprises, in order from the object side, the first-a lens group that is fixed during focusing, and the first-b lens group that moves during focusing. In a case where the angle of view of the image data of the output area fluctuates with a focus operation, the angle of view is corrected by subjecting the source image data to the magnification and reduction processing. The angle of view is corrected to the reference angle of view determined for each focal length.

According to the invention, it is possible to provide an imaging apparatus, a signal processing method for an imaging apparatus, and a non-transitory computer readable recording medium storing a signal processing program for an imaging apparatus capable of capturing a high quality image with a compact configuration.

BRIEF DESCRIPTION OF THE DRAWINGS

FIG. 6 is a block diagram of a part of functions that are provided by an imaging apparatus body control unit.

FIG. 19 is a table showing basic lens data in a case where an imaging lens of Example 1 is focused on an object at infinity.

FIG. 20 is a table showing specifications of the imaging lens of Example 1 respectively at a wide angle end, a middle focal length state, and a telephoto end.

FIG. 21 is a table showing zoom distances of the imaging lens of Example 1 respectively at the wide angle end, the middle focal length state, and the telephoto end.

FIG. 22 is a table showing surface numbers of aspheric surfaces and aspheric coefficients of the aspheric surfaces of the imaging lens of Example 1.

FIG. 23 is a diagram of respective aberrations of the imaging lens of Example 1.

FIG. 24 is a table showing basic lens data in a case where an imaging lens of Example 2 is focused on an object at infinity.

FIG. 25 is a table showing specifications of the imaging lens of Example 2 respectively at the wide angle end, the middle focal length state, and the telephoto end.

FIG. 26 is a table showing zoom distances of the imaging lens of Example 2 respectively at the wide angle end, the middle focal length state, and the telephoto end.

FIG. 27 is a table showing surface numbers of aspheric surfaces and aspheric coefficients of the aspheric surfaces of the imaging lens of Example 2.

FIG. 28 is a diagram of respective aberrations of the imaging lens of Example 2.

FIG. 29 is a table showing basic lens data in a case where an imaging lens of Example 3 is focused on an object at infinity.

FIG. 30 is a table showing specifications of the imaging lens of Example 3 respectively at the wide angle end, the middle focal length state, and the telephoto end.

FIG. 31 is a table showing zoom distances of the imaging lens of Example 3 respectively at the wide angle end, the middle focal length state, and the telephoto end.

FIG. 32 is a table showing surface numbers of aspheric surfaces and aspheric coefficients of the aspheric surfaces of the imaging lens of Example 3.

FIG. 33 is a diagram of respective aberrations of the imaging lens of Example 3.

FIG. 34 is a table showing effects in lens design with application of the invention in comparison with an imaging lens with no application of the invention.

DESCRIPTION OF THE PREFERRED EMBODIMENTS

Hereinafter, preferred embodiments for carrying out the invention will be described in detail referring to the accompanying drawings.

First Embodiment

[Apparatus Configuration]

Figure 1:
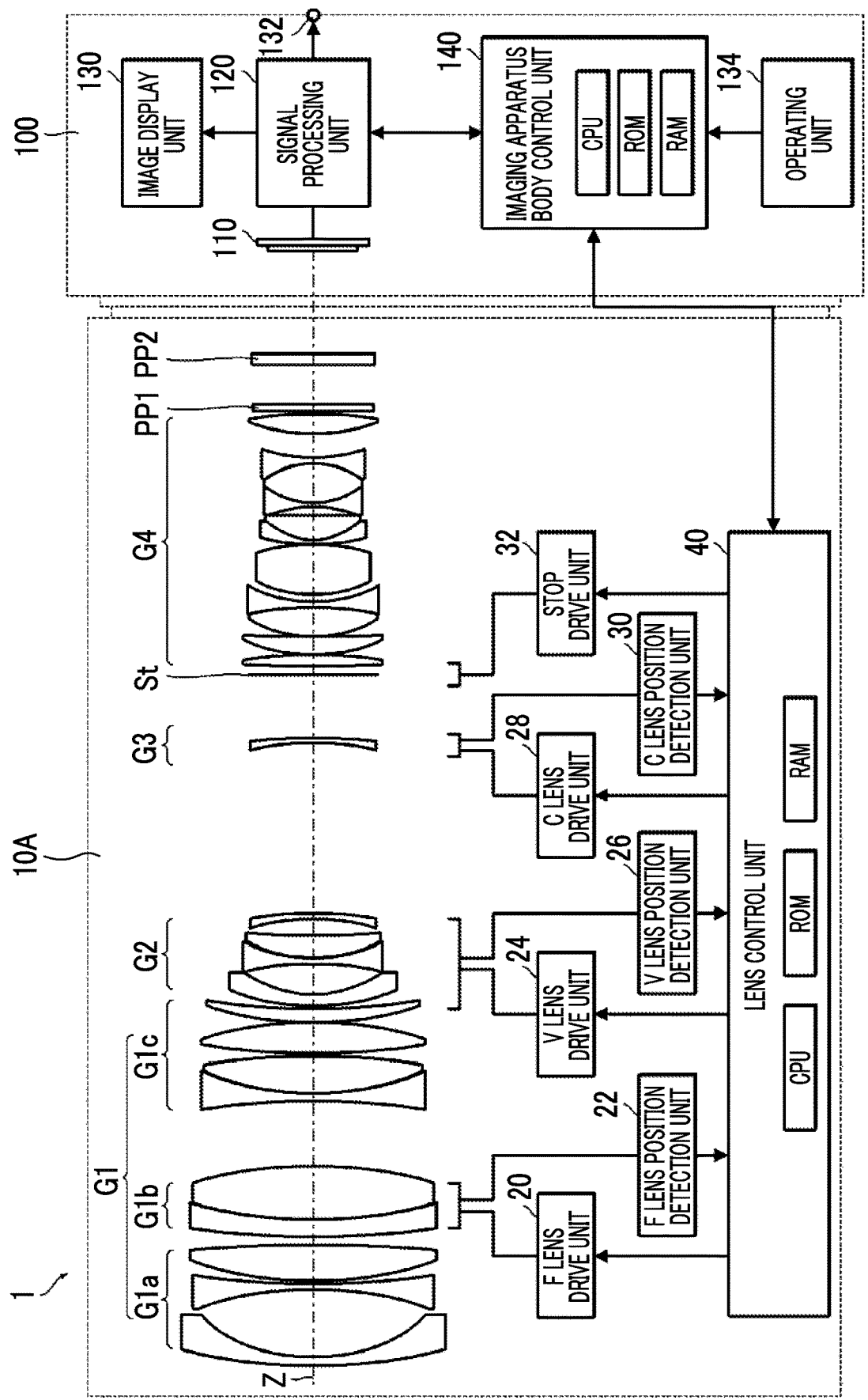
FIG. 1 is a schematic configuration diagram showing an embodiment of an imaging apparatus to which the invention is applied.

FIG. 1 is a schematic configuration diagram showing an embodiment of an imaging apparatus to which the invention is applied.

As shown in FIG. 1, an imaging apparatus 1 primarily comprises an imaging lens 10A and an imaging apparatus body 100. The imaging lens 10A is attachable and detachable with respect to the imaging apparatus body 100 and is attachably and detachably mounted in the imaging apparatus body 100 through a mount. That is, in the imaging apparatus 1 of the embodiment, the imaging lens 10A is interchangeable.

<<Imaging Lens>>
<Lens Configuration>

Figure 2:
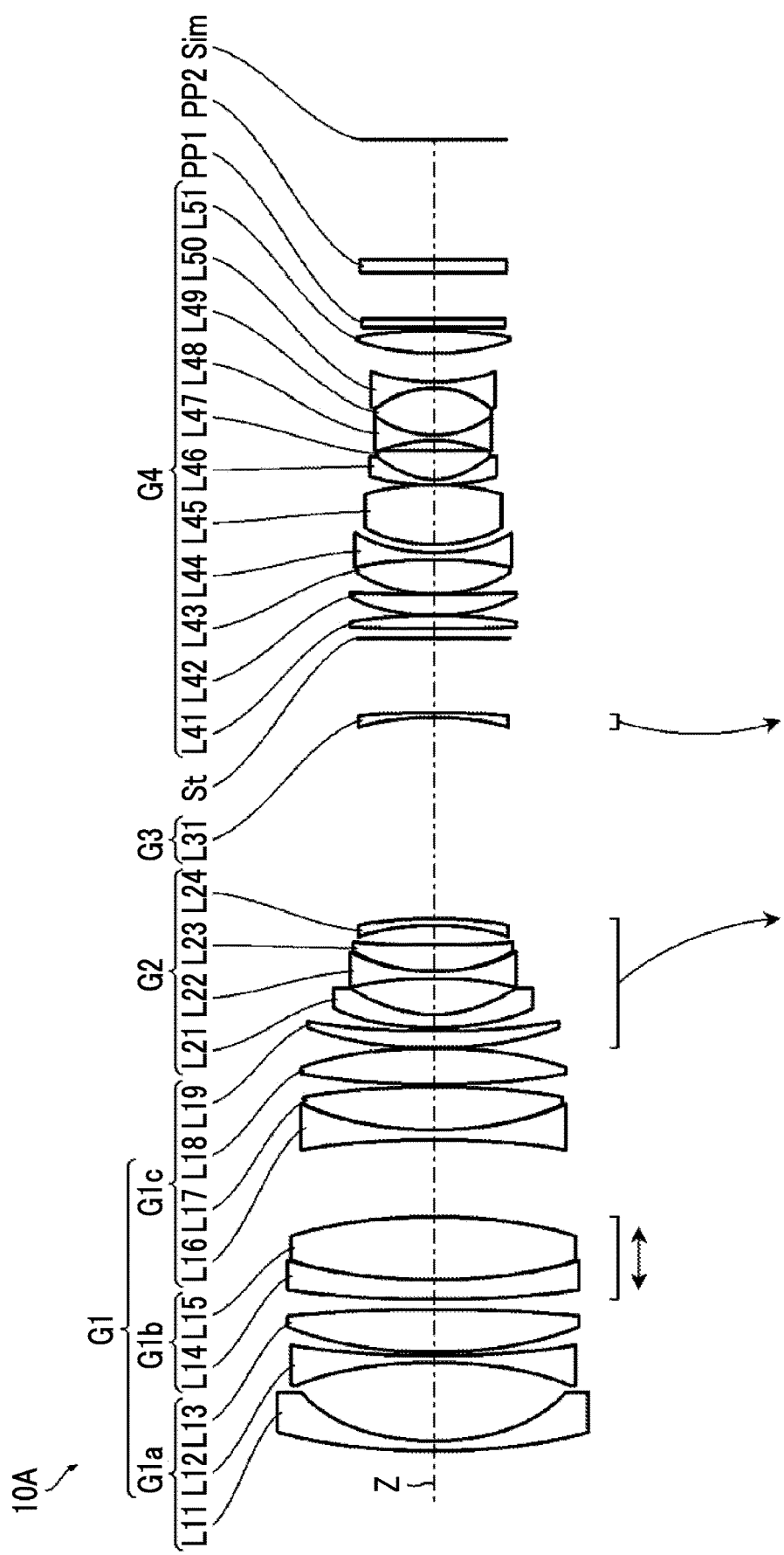
FIG. 2 is a sectional view showing the lens configuration of an imaging lens.

FIG. 2 is a sectional view showing the lens configuration of the imaging lens. In FIG. 2, the left side is an object side, and the right side is an image side. In FIG. 2, lens arrangement at a wide angle end in a case where an object at infinity is brought into focus is shown.

Figure 3A:
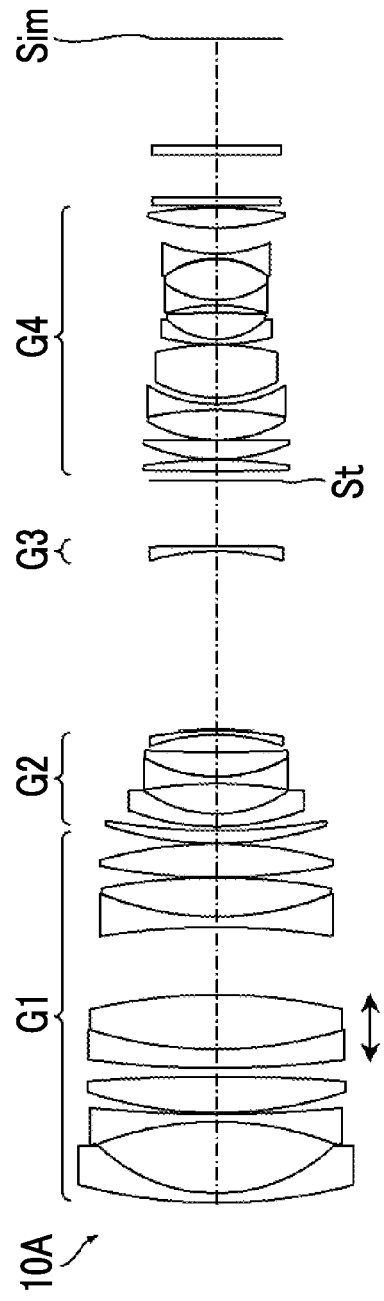
FIGS. 3A to 3C are diagrams showing a movement state of each lens in a case where the imaging lens shown in FIG. 2 is operated for variable magnification.
Figure 3B:
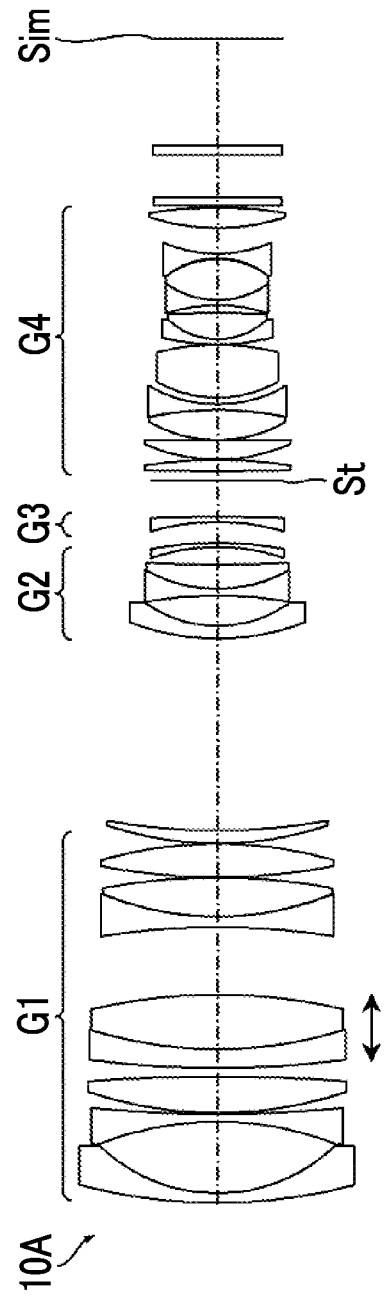
Figure 3C:
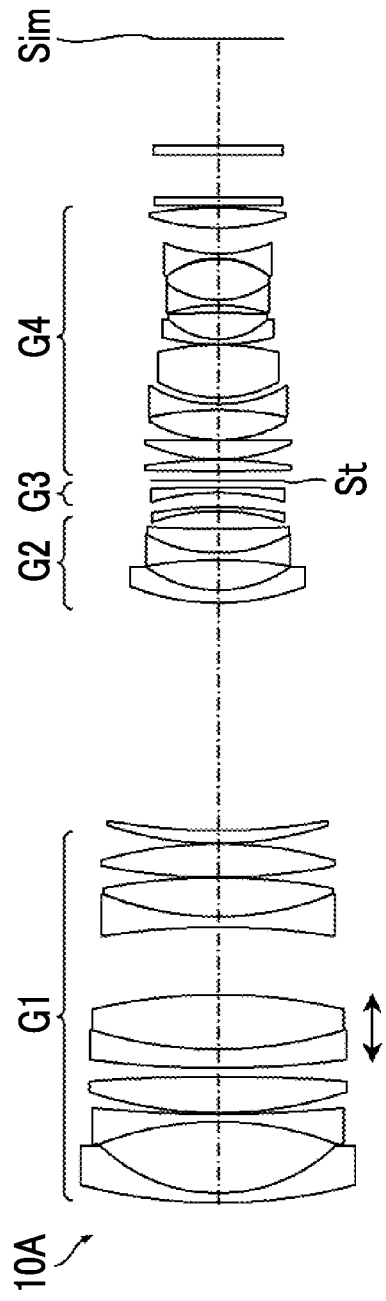

FIGS. 3A to 3C are diagrams showing a movement state of each lens in a case where the imaging lens shown in FIG. 2 is operated for variable magnification. FIGS. 3A to 3C show a movement state of each lens during variable magnification in a case where the object at infinity is brought into focus.

FIG. 3A shows lens arrangement at a wide angle end. FIG. 3B shows lens arrangement in a middle focal length state. FIG. 3C shows lens arrangement at a telephoto end.

The imaging lens 10A of the embodiment is a zoom lens, and is substantially composed of four lens groups. Specifically, the imaging lens 10A is configured such that a first lens group G1 having positive refractive power, a second lens group G2 having negative refractive power, a third lens group G3 having negative refractive power, and a fourth lens group G4 having positive refractive power are arrayed in order from the object side.

In the imaging lens 10A, it is preferable that a cover glass and various filters, such as an infrared cut filter and a low-pass filter, are arranged between an optical system and an image plane Sim according to the configuration of the imaging apparatus body in which the imaging lens 10A is mounted. For this reason, in an example shown in FIGS. 1 and 2, an example where parallel flat plate-shaped optical members PP1 and PP2 assumed to be an optical member are arranged between a lens system and the image plane Sim is shown.

In the imaging lens 10A, during variable magnification, the first lens group G1 and the fourth lens group G4 are fixed in an optical axis direction with respect to the image plane Sim, and the second lens group G2 and the third lens group G3 move in the optical axis direction. The second lens group G2 moves to the image side along an optical axis Z during variable magnification from the wide angle end to the telephoto end. The third lens group G3 moves in conjunction with the second lens group G2 and corrects fluctuation of the image plane due to the movement of the second lens group G2. In FIG. 2, a schematic movement locus of each of the second lens group G2 and the third lens group G3 during variable magnification from the wide angle end to the telephoto end is indicated by an arrow of a solid line below each lens group. The third lens group G3 may be configured to move to the object side, and then, to move the image side, for example, during variable magnification from the wide angle end to the telephoto end. With such a configuration, it is possible to reduce a movement space of the third lens group G3 needed during variable magnification, and to contribute to reduction in size in the optical axis direction.

[First Lens Group]

The first lens group G1 is a focusing lens group. The first lens group G1 is composed of, arranged in order from the object side, a first-a lens group G1a having negative refractive power, a first-b lens group G1b having positive refractive power, and a first lens group rear group G1c having positive refractive power.

In the zoom lens having the four-group configuration, the first lens group G1 comprises the three lens groups, whereby it is possible to suppress fluctuation of the angle of view accompanied by focusing.

The first-a lens group G1a is operated to refract a peripheral light beam incident from the object side such that an angle between a peripheral light beam emitted from the first-a lens group G1a and the optical axis Z decreases. With this operation, it is possible to reduce the amount of change in ray height of a peripheral light beam in the first-b lens group G1b. On the other hand, in regard to an axial light beam, a ray height in the first lens group G1 increases, and the amount of generated spherical aberration is likely to increase. For this reason, a configuration in which the first lens group rear group G1c corrects spherical aberration is made.

The imaging lens 10A of the embodiment employs a so-called inner focus system, and in the imaging lens 10A, a lens group that is moved during focusing is only the first-b lens group G1b. In FIG. 2, a two-way arrow indicating that is described below the first-b lens group G1b. Only the first-b lens group G1b with a small amount of change in ray height of the peripheral light beam is moved in the optical axis direction to perform focusing, whereby it is possible to reduce fluctuation of the angle of view and fluctuation of aberration during focusing, and to suppress change in performance with focusing.

The first-a lens group G1a is an example of a first-a lens group. The first-a lens group G1a is composed of, arranged in order from the object side, a negative lens L11, a negative lens L12, and a positive lens L13. The most object-side lens group of the first lens group G1 is composed in such a manner, whereby it is possible to reduce the diameter of the first lens group G1.

The first-b lens group G1b is an example of a first-b lens group. The first-b lens group G1b is composed of a set of cemented lenses in which a negative lens L14 and a positive lens L15 are cemented. The first-b lens group G1b is composed in such a manner, whereby it is possible to suppress fluctuation of chromatic aberration during focusing while making the configuration compact.

In a case where the first-b lens group G1b is composed of a set of cemented lenses, it is preferable that a negative lens and a positive lens are arranged in order from the object side. With such a configuration, it is possible to easily correct chromatic aberration in a case where an object distance fluctuates. Furthermore, it is preferable that these lenses are a negative meniscus lens convex toward the object side and a biconvex lens, respectively. With such a configuration, it is possible to more easily correct chromatic aberration in a case where the object distance fluctuates.

The first lens group rear group G1c is composed of, arranged in order from the object side, a cemented lens in which a lens L16 having a biconcave shape and a lens L17 having a biconvex shape are cemented, a lens L18 having a biconvex shape, and a lens L19 having a positive meniscus shape. The first lens group rear group G1c is composed in such a manner, whereby it is possible to reduce the amount of generated spherical aberration on a telephoto side.

The first lens group G1 is composed of the lenses L11 to L19 described above, and power arrangement within the first lens group G1 is preferably set, whereby it is possible to suppress fluctuation of the angle of view during focusing. Power distribution to the entire system is important, and it is preferable that power distribution of the first lens group G1 to the entire system is set such that aberrations can be satisfactorily corrected and a lightweight and compact configuration can be made.

[Second Lens Group and Third Lens Group]

The second lens group G2 and the third lens group G3 are an example of a plurality of movable lens groups, and compose a zoom lens group. In regards to the second lens group G2 and the third lens group G3, the second lens group G2 composes a variator lens group, and the third lens group G3 composes a compensator lens group.

The second lens group G2 is composed of, arranged in order from the object side, a negative lens L21, a negative lens L22, a positive lens L23, and a negative lens L24. The negative lens L22 and the positive lens L23 may be cemented. At least one surface of the lens L21 may be an aspheric surface. With such a configuration, it becomes easy to suppress fluctuation of aberration during variable magnification.

In an example shown in FIG. 2, a surface in which an aspheric surface is formed in the entire system is only a surface of the object-side surface of the lens L21 of the second lens group G2, and all other lens surfaces are spherical. A surface in which an aspheric surface is formed is not in the first lens group G1 having a large diameter, but is provided in the second lens group G2, whereby reduction in cost is achieved. A surface in which an aspheric surface is provided is not limited to the above-described example, and for example, other surfaces may be aspherical. In this case, it is possible to more satisfactorily perform aberration correction.

The third lens group G3 is composed of one negative lens L31. The third lens group G3 that moves during variable magnification has a single lens configuration, whereby it is possible to simplify a drive mechanism, and to achieve compactness and reduction in weight of the imaging lens 10A.

[Fourth Lens Group]

The fourth lens group G4 is an example of a final lens group and composes a relay lens group. The fourth lens group G4 is composed of 11 pieces lenses of a positive lens L41, a positive lens L42, a positive lens L43, a positive lens L44, a positive lens L45, a negative lens L46, a positive lens L47, a negative lens L48, a positive lens L49, a negative lens L50, and a positive lens L51 in order from the object side.

[Aperture Stop]

It is preferable that the aperture stop St is arranged closer to the image side than the third lens group G3, and is fixed during variable magnification. With such a configuration, it is possible to make an F-Number constant during variable magnification. For example, in the example shown in FIG. 2, the aperture stop St is arranged between the third lens group G3 and the fourth lens group G4.

The aperture stop St shown in FIG. 2 does not necessarily represent a size or a shape, and indicates a position on the optical axis Z.

The imaging lens 10A of the embodiment is configured as described above. In a case where the imaging lens 10A is used in a severe environment, it is preferable to apply protective multilayer film coating. In addition to the protective coating, antireflective coating for reducing ghost light may be applied.

In the example shown in FIG. 2, although an example where the optical members PP1 and PP2 are arranged between the lens system and the image surface has been described, the optical members PP1 and PP2 may be arranged between the lenses. Alternatively, coating having the same function as the optical members PP1 and PP2 may be applied to a lens surface of any one of the lenses.

As described above, in the imaging lens 10A of the embodiment, the first-a lens group G1a as a head lens group and the fourth lens group G4 as a final lens group are fixed during variable magnification and during focusing. That is, the imaging lens 10A of the embodiment is a zoom lens with an unchanged total length through a focus operation and a zoom operation.

<Drive System of Lens>

As shown in FIG. 1, the imaging lens 10A comprises, as a drive system, a focusing lens drive unit 20 that drives the focusing lens group, a focusing lens position detection unit 22 that detects a position of the focusing lens group, a variator lens drive unit 24 that drives the variator lens group, a variator lens position detection unit 26 that detects a position of the variator lens group, a compensator lens drive unit 28 that drives the compensator lens group, a compensator lens position detection unit 30 that detects a position of the compensator lens group, a stop drive unit 32 that drives the aperture stop St, and a lens control unit 40 that controls the operation of the imaging lens 10A.

[Focusing Lens Drive Unit]

As described above, the focusing lens group is composed of the first lens group G1. In the first lens group G1, only the first-b lens group G1b is moved to perform focusing. The focusing lens drive unit 20 moves the first-b lens group G1b along the optical axis Z. The focusing lens drive unit 20 comprises, for example, a guide mechanism that guides the movement of the first-b lens group G1b, a motor that moves the first-b lens group G1b in a front-back direction along the optical axis Z, and a drive circuit of the motor. The motor is configured of, for example, a linear motor.

[Focusing Lens Position Detection Unit]

The focusing lens position detection unit 22 detects the position of the first-b lens group G1b based on a focusing origin set as a reference in advance. The focusing origin is set within a movement range of the first-b lens group G1b. The focusing lens position detection unit 22 comprises, for example, an origin detection sensor that detects that the first-b lens group G1b is positioned at the focusing origin, and a movement amount detection sensor that detects the amount of movement of the first-b lens group G1b from the focusing origin. The origin detection sensor is configured of, for example, a photo-interrupter. The movement amount detection sensor is configured of, for example, a magnetic scale and a magnetic sensor.

[Variator Lens Drive Unit]

As described above, the variator lens group is composed of the second lens group G2. The variator lens drive unit 24 moves the second lens group G2 along the optical axis Z. The variator lens drive unit 24 comprises, for example, a guide mechanism that guides the movement of the second lens group G2, a motor that moves the second lens group G2 in a front-back direction along the optical axis Z, and a drive circuit of the motor thereof. The motor is configured of, for example, a linear motor.

[Variator Lens Position Detection Unit]

The variator lens position detection unit 26 detects the position of the second lens group G2 based on a variator origin set as a reference in advance. The variator origin is set within a movement range of the second lens group G2. The variator lens position detection unit 26 comprises, for example, an origin detection sensor that detects that the second lens group G2 is positioned at the variator origin, and a movement amount detection sensor that detects the amount of movement of the second lens group G2 from the variator origin. The origin detection sensor is configured of, for example, a photo-interrupter. The movement amount detection sensor is configured of, for example, a magnetic scale and a magnetic sensor.

[Compensator Lens Drive Unit]

As described above, the compensator lens group is composed of the third lens group G3. The compensator lens drive unit 28 moves the third lens group G3 along the optical axis Z. The compensator lens drive unit 28 comprises, for example, a guide mechanism that guides the movement of the third lens group G3, a motor that moves the third lens group G3 in a front-back direction along the optical axis Z, and a drive circuit of the motor. The motor is configured of, for example, a linear motor.

[Compensator Lens Position Detection Unit]

The compensator lens position detection unit 30 detects the position of the third lens group G3 based on a compensator origin set as a reference in advance. The compensator origin is set within a movement range of the third lens group G3. The compensator lens position detection unit 30 comprises, for example, an origin detection sensor that detects that the third lens group G3 is positioned at the compensator origin, and a movement amount detection sensor that detects the amount of movement of the third lens group G3 from the compensator origin. The origin detection sensor is configured of, for example, a photo-interrupter. The movement amount detection sensor is configured of, for example, a magnetic scale and a magnetic sensor.

[Stop Drive Unit]

The stop drive unit 32 drives the aperture stop St. The aperture stop St is configured of, for example, an iris stop. The stop drive unit 32 comprises a motor that magnifies and reduces a stop leaf blade, and a drive circuit of the motor.

[Lens Control Unit]

The lens control unit 40 integrally controls the operation of the imaging lens 10A. The lens control unit 40 is configured of a microcomputer comprising a central processing unit (CPU), a read only memory (ROM), and a random access memory (RAM). That is, the microcomputer executes a predetermined program, whereby various functions as the lens control unit 40 are provided. The program that is executed by the microcomputer is stored in the ROM.

The lens control unit 40 controls the drive of the respective units of the imaging lens 10A based on commands from the imaging apparatus body 100. For example, the lens control unit 40 controls the drive of the focusing lens drive unit 20 to operate the first-b lens group G1b based on a focus command from the imaging apparatus body 100. The lens control unit 40 controls the drive of the variator lens drive unit 24 and the compensator lens drive unit 28 to operate the second lens group G2 and the third lens group G3 based on a zoom command from the imaging apparatus body 100. The lens control unit 40 controls the drive of the stop drive unit 32 to operate the aperture stop St based on a stop command from the imaging apparatus body 100.

The lens control unit 40 transmits information regarding the current position of the first-b lens group G1b detected by the focusing lens position detection unit 22, information regarding the current position of the second lens group G2 detected by the variator lens position detection unit 26, and information regarding the current position of the third lens group G3 detected by the compensator lens position detection unit 30 to the imaging apparatus body 100.

<<Imaging Apparatus Body>>

As shown in FIG. 1, the imaging apparatus body 100 comprises an image sensor 110 as imaging means, a signal processing unit 120 that processes a signal output from the image sensor 110 to generate image data for output, an image display unit 130 that displays image data generated by the signal processing unit 120, an image output terminal 132 that outputs image data generated by the signal processing unit 120, an operating unit 134 that performs various operations, and an imaging apparatus body control unit 140 that controls the operation of the imaging apparatus body 100.

<Image Sensor>

The image sensor 110 captures an image formed by the imaging lens 10A. The image sensor 110 is configured of, for example, a solid imaging element having a predetermined color filter array, such as a complementary metal oxide semiconductor (CMOS) or a charged coupled device (CCD).

<Signal Processing Unit>

The signal processing unit 120 processes a signal output from the image sensor 110 to generate image data for output. In this case, correction processing of focus breathing is also executed. Specific processing contents of the signal processing unit 120 will be described below in detail.

<Image Display Unit>

The image display unit 130 displays image data for output generated by the signal processing unit 120. The image display unit 130 is configured of, for example, a liquid crystal motor.

<Image Output Terminal>

The image output terminal 132 outputs image data for output generated by the signal processing unit 120.

<Operating Unit>

The operating unit 134 includes various operation members, such as a focus demand and a zoom demand, and an operation circuit that outputs operation signals of the operation members to the imaging apparatus body control unit 140.

<<Imaging Apparatus Body Control Unit>>

The imaging apparatus body control unit 140 integrally controls the operation of the whole imaging apparatus including the imaging apparatus body 100. The imaging apparatus body control unit 140 is configured of a microcomputer comprising a CPU, a ROM, and a RAM. That is, the microcomputer executes a predetermined program, whereby various functions as the imaging apparatus body control unit 140 are provided. The program that is executed by the microcomputer is stored in the ROM.

The imaging apparatus body control unit 140 controls the imaging apparatus body 100 and controls the imaging lens 10A based on an operation of the operating unit 134. For example, the imaging apparatus body control unit 140 outputs a focus command to the imaging lens 10A based on a focus operation of the operating unit 134. The imaging apparatus body control unit 140 outputs a zoom command to the imaging lens 10A based on a zoom operation of the operating unit 134.

The imaging apparatus body control unit 140 executes processing for acquiring information regarding the size of the image circle from the imaging lens 10A, processing for setting an effective area and an output area based on acquired information regarding the size of the image circle and information regarding the size of the image sensor 110, processing for acquiring information regarding the currently set focus position of the imaging lens 10A, processing for acquiring information regarding the currently set focal length of the imaging lens 10A, and the like. Details of these kinds of processing will be described below.

<<Details of Signal Processing Unit>>

As described above, the signal processing unit 120 processes the signal output from the image sensor 110 to generate image data for output. In this case, correction processing of focus breathing is also executed.

Figure 4:
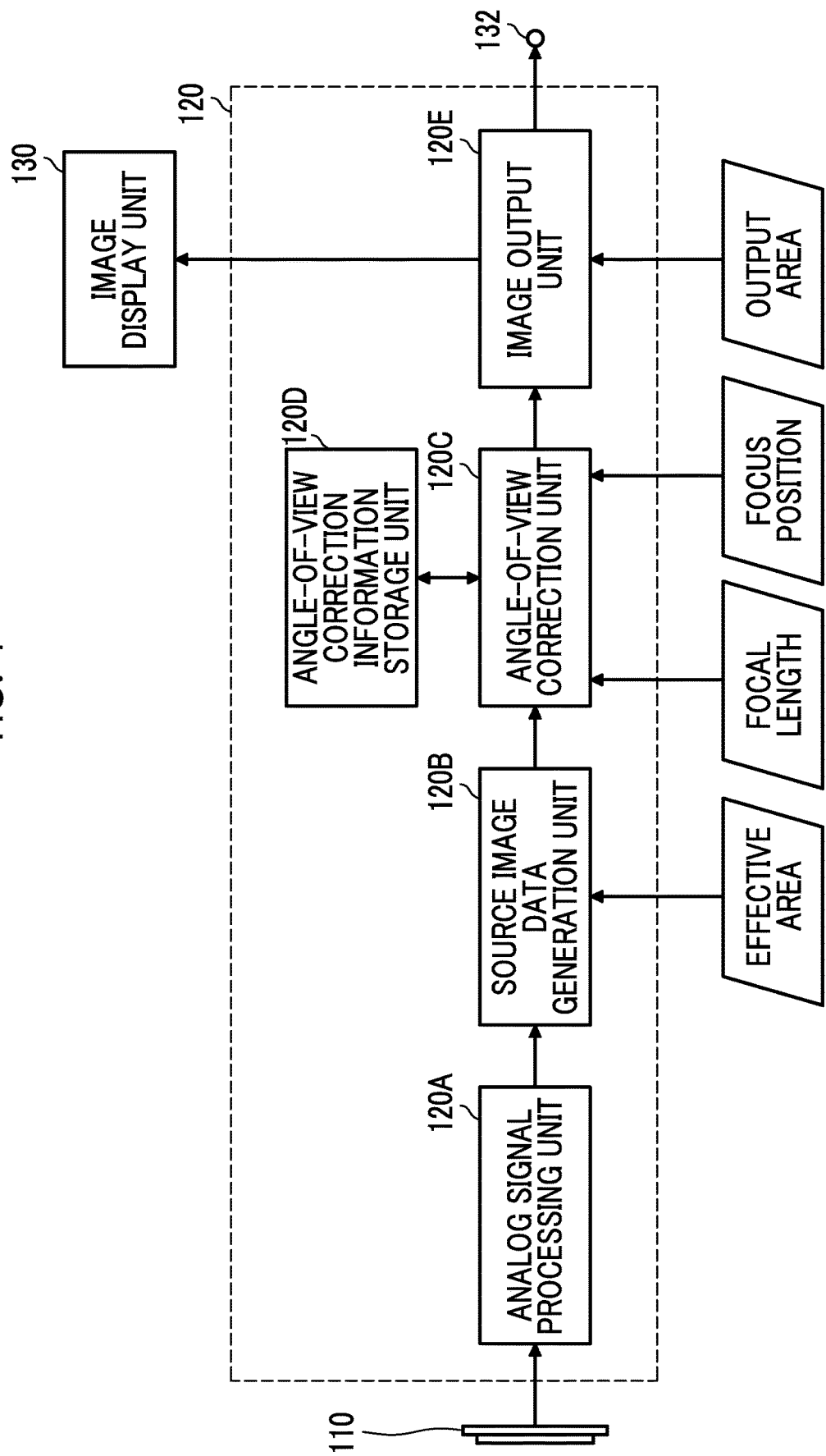
FIG. 4 is a block diagram of functions that are provided by a signal processing unit.

FIG. 4 is a block diagram of functions that are provided by the signal processing unit.

As shown in FIG. 4, the signal processing unit 120 comprises an analog signal processing unit 120A, a source image data generation unit 120B, an angle-of-view correction unit 120C, an angle-of-view correction information storage unit 120D, and an image output unit 120E.

<Analog Signal Processing Unit>

The analog signal processing unit 120A executes needed signal processing, such as correlated double sampling (CDS) processing, automatic gain control (AGC) processing, or clamp processing, on an analog image signal output from the image sensor 110, converts the analog image signal after the processing to a digital image signal, and outputs the digital image signal.

<Source Image Data Generation Unit>

The source image data generation unit 120B executes needed signal processing, such as various kinds of correction processing, such as white balance adjustment, gamma correction, and sharpness correction, demosaicing processing (processing for executing color interpolation processing on an image signal of R, G, and B to generate a set of image signals (R signal, G signal, and B signal) output from each pixel of the image sensor 110), and YCrCb conversion processing (processing for converting the demosaiced R, G, and B signals for each pixel to a brightness signal Y and color difference signals Cr and Cb), on the digital image signal output from the analog signal processing unit 120A to generate image data (source image data).

Here, the image signal that is subjected to the processing in the source image data generation unit 120B is an image signal that is output from an effective area of the image sensor 110.

The effective area of the image sensor 110 is an area where a normal image is to be captured in the image sensor 110. The effective area is set by an effective pixel area of the image sensor 110 and the image circle of the imaging lens 10A.

The effective pixel area of the image sensor 110 is an area where an image is actually to be captured in the image sensor 110. In a case where the size of the image circle of the imaging lens 10A is greater than the effective pixel area of the image sensor 110, the effective area is to coincide with the effective pixel area.

Figure 5A:
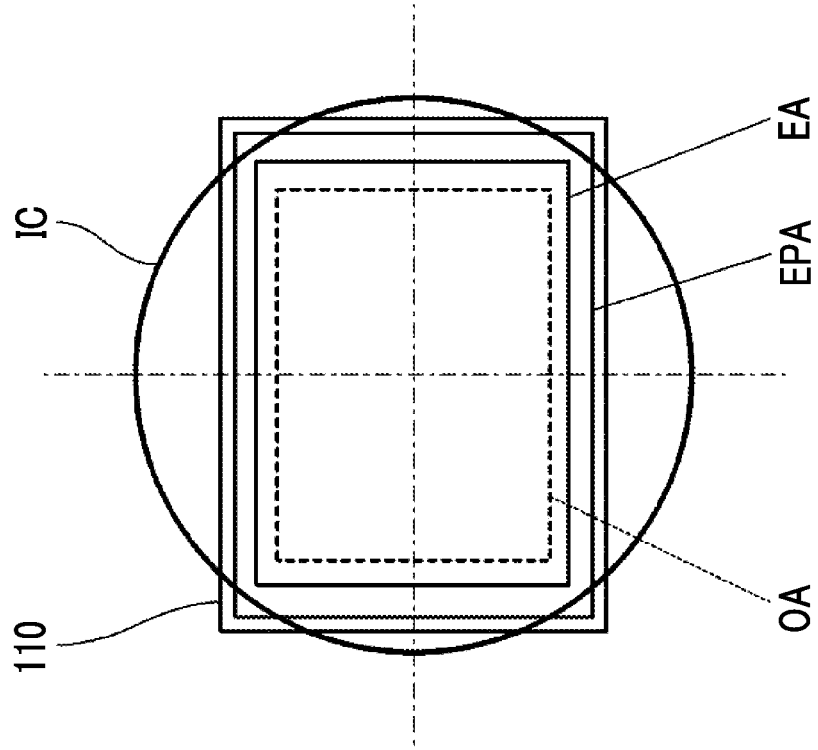
FIGS. 5A and 5B are diagrams showing the relationship of an effective area, an effective pixel area, and an output area.
Figure 5B:
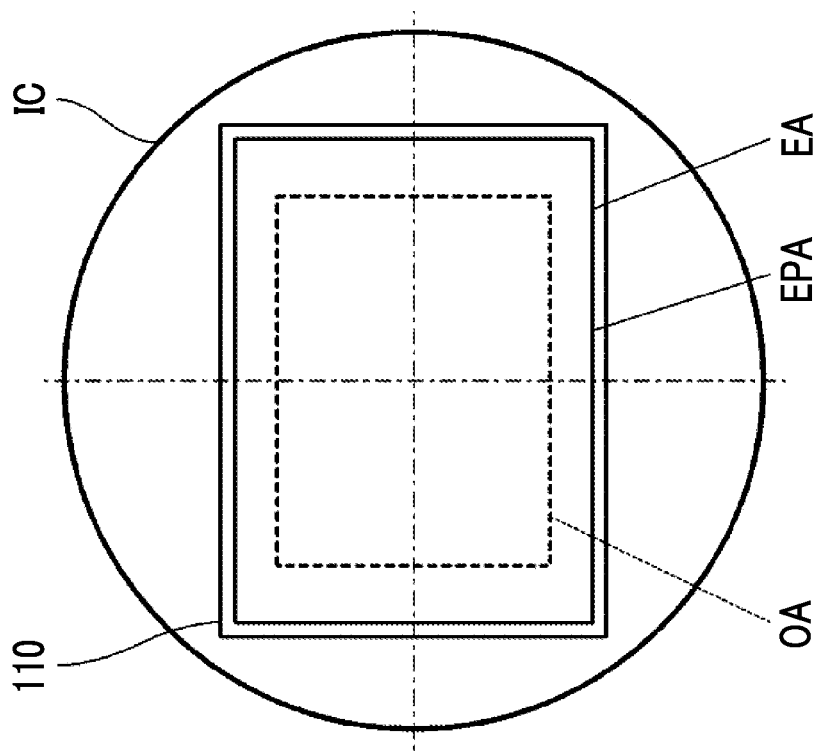

FIGS. 5A and 5B are diagrams showing the relationship of the effective area, the effective pixel area, and the output area. FIG. 5A shows an example of a case where the size of the image circle of the imaging lens 10A is greater than the effective pixel area, and FIG. 5B shows an example of a case where the size of the image circle of the imaging lens 10A is smaller than the effective pixel area.

As shown in FIG. 5A, in a case where the size of an image circle IC of the imaging lens 10A is greater than an effective pixel area EPA of the image sensor 110, an effective area EA coincides with the effective pixel area EPA.

As shown in FIG. 5B, in a case where the size of the image circle IC of the imaging lens 10A is smaller than the effective pixel area EPA of the image sensor 110, the effective area EA is set within the effective pixel area EPA.

The size of the image circle IC is prescribed by the diameter of the image circle IC, and the size of the effective pixel area EPA is prescribed by the diagonal length of the effective pixel area EPA. The size of the effective pixel area EPA becomes the size of the image sensor 110.

In FIGS. 5A and 5B, a frame OA indicated by a broken line is a frame indicating the output area. The output area is an area that the imaging apparatus 1 outputs as a captured image from the image output unit 120E. An output area OA is necessarily set inside the effective area EA.

The effective area and the output area are set by the imaging apparatus body control unit 140. FIG. 6 is a block diagram of a part of functions that are provided by the imaging apparatus body control unit.

The imaging apparatus body control unit 140 acquires information regarding the size of the image circle of the mounted imaging lens 10A and sets the effective area and the output area based on the acquired information regarding the size of the image circle and information regarding the size of the image sensor 110. For this reason, the imaging apparatus body control unit 140 comprises a function of acquiring information regarding the size of the image circle from the mounted imaging lens 10A, a function of acquiring information regarding the size of the image sensor 110, and a function of setting the effective area and the output area based on the acquired information regarding the size of the image circle and information regarding the size of the image sensor 110.

The function of acquiring information regarding the size of the image circle from the mounted imaging lens 10A is provided by the lens information acquisition unit 140A, the function of acquiring information regarding the size of the image sensor 110 is provided by the image sensor size information acquisition unit 140B, and the function of setting the effective area and the output area based on the acquired information regarding the size of the image circle and information regarding the size of the image sensor 110 is provided by the area setting unit 140C.

In a case where the imaging lens 10A is mounted in the imaging apparatus body 100, the lens information acquisition unit 140A performs communication with the lens control unit 40 to acquire lens information from the lens control unit 40.

Here, the lens information is information indicating the specification of the imaging lens. Information regarding the size of the image circle of the imaging lens 10A is included in the lens information. In addition, the lens information also includes, for example, lens model data, lens characteristic data, lens characteristic correction data, and the like. Lens model data includes a lens model name, a focal length, an open F-Number, a manufacturer name, and the like. Lens characteristic data includes brightness shading data, color shading data, distortion data, aberration data, and the like. Lens characteristic correction data includes brightness shading correction data, color shading correction data, distortion correction data, aberration correction data, and the like.

The lens information is stored in the ROM of the lens control unit 40. The lens control unit 40 reads the lens information from the ROM and transmits the lens information to the imaging apparatus body control unit 140.

The image sensor size information acquisition unit 140B reads and acquires information regarding the size of the image sensor 110 from the ROM of the imaging apparatus body control unit 140. In the ROM of the imaging apparatus body control unit 140, information regarding the size of the image sensor 110 is stored in advance.

The area setting unit 140C sets the effective area and the output area based on information regarding the size of the image circle of the imaging lens 10A and the size of the image sensor 110 (the size of the effective pixel area).

As described above, in a case where the size of the image circle of the imaging lens 10A is greater than the size of the image sensor 110 (the size of the effective pixel area), the effective area is set to the same area as the effective pixel area (see FIG. 5A). That is, the effective pixel area of the image sensor 110 is set to the effective area.

In a case where the size of the image circle of the imaging lens 10A is smaller than the size of the image sensor 110 (the size of the effective pixel area), the effective area is set inside the effective pixel area and is set inside the image circle (see FIG. 5B). In this case, the effective area is set in a predetermined aspect ratio and is set in as large a size as possible.

The output area is set inside the effective area. The output area can be optionally set within the effective area, and a maximum range thereof is the same area as the effective area. The output area is determined in advance and is stored in the ROM of the imaging apparatus body control unit 140. The area setting unit 140C reads information regarding the output area from the ROM and sets the output area.

There is a case where the size of the output area becomes greater than the size of the effective area depending on the imaging lens 10A to be mounted. In this case, for example, a warning may be issued. The warning is performed, for example, by displaying a warning message on the image display unit 130.

Information regarding to the effective area set by the area setting unit 140C is applied to the source image data generation unit 120B. The source image data generation unit 120B processes the image signal output from the analog signal processing unit 120A based on the acquired information regarding the effective area to generate image data. Image data generated by the source image data generation unit 120B is referred to as source image data. Source image data is image data that is generated by processing a signal output from the effective area of the image sensor 110.

Information regarding the output area set by the area setting unit 140C is applied to the image output unit 120E. The image output unit 120E extracts and outputs image data of an area corresponding to the output area from source image data based on the acquired information regarding the output area. Image data output from the image output unit 120E is referred to as output image data. Output image data corresponds to image data of the output area. Details of the image output unit 120E will be described below.

<Angle-of-View Correction Unit and Angle-of-View Correction Information Storage Unit>

The angle-of-view correction unit 120C subjects source image data to magnification and reduction processing to correct an angle of view of image data of the output area. In this case, the angle-of-view correction unit 120C subjects source image data to the magnification and reduction processing in conjunction with focusing and corrects the angle of view of output image data to a reference angle of view determined for each focal length. With this, it is possible to correct fluctuation of the angle of view accompanied by focusing.

The angle-of-view correction information storage unit 120D stores correction information of the angle of view needed in a case where the angle-of-view correction unit 120C subjects source image data to the magnification and reduction processing. The angle-of-view correction information storage unit 120D is configured of, for example, a ROM.

Figure 7:
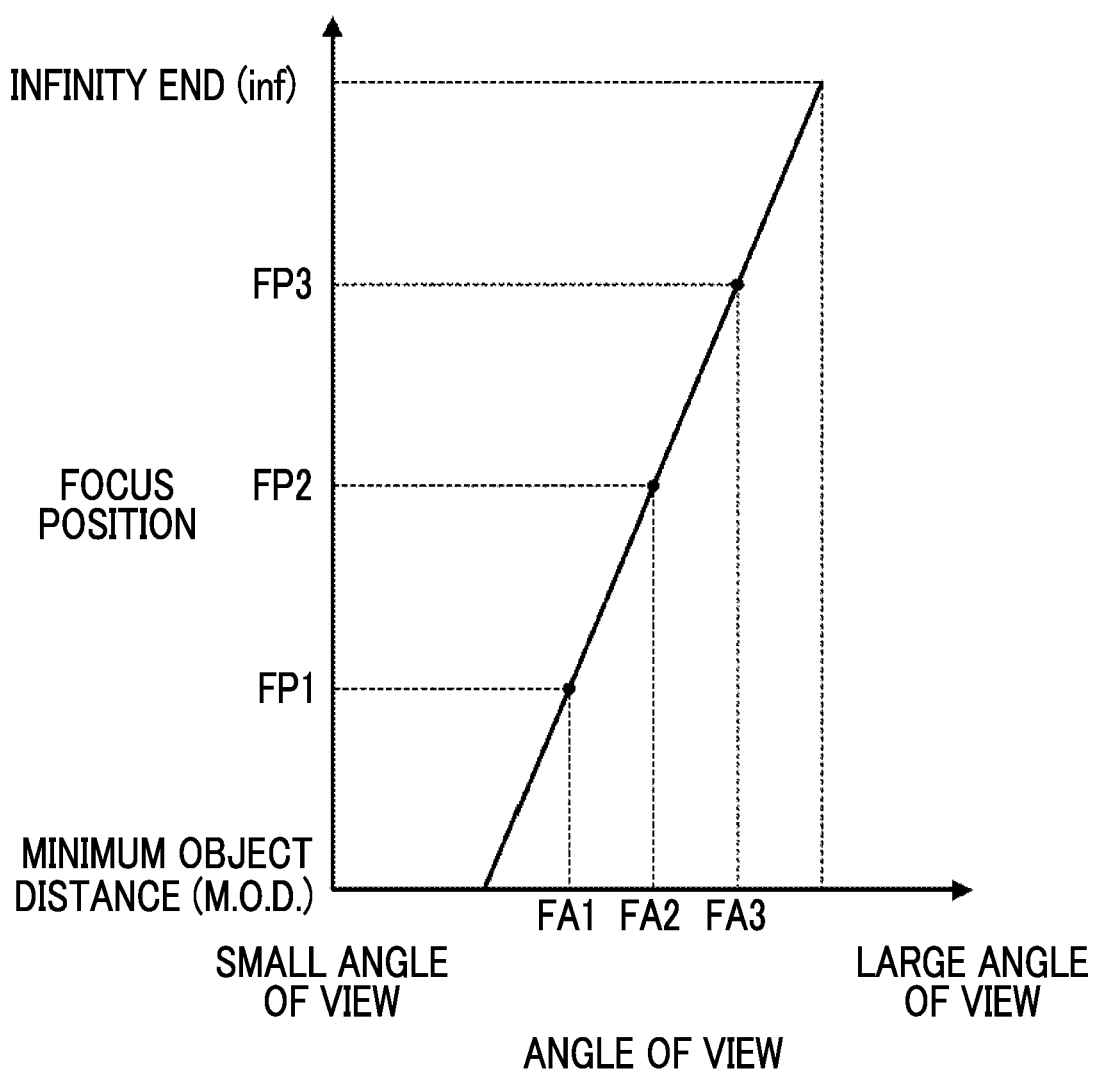
FIG. 7 is a graph showing the relationship between a focus position and an angle of view of output image data.

FIG. 7 is a graph showing the relationship between the focus position and the angle of view of output image data. In FIG. 7, the vertical axis is the focus position, and the horizontal axis is the angle of view of output image data. In an example shown in FIG. 7, for simplification of description, although the relationship between the focus position and the angle of view is shown by a straight line, in a case where the focus position is changed, how the angle of view changes is different with the imaging lens. Even in the same imaging lens, a manner of change in angle of view is different with the focal length.

As shown in FIG. 7, the angle of view changes depending on the focus position. Accordingly, image data is subjected to the magnification and reduction processing (also referred to as an electronic beam or a digital zoom) depending on the focus position, whereby it is possible to correct fluctuation of the angle of view, and to correct focus breathing.

For example, in the example shown in FIG. 7, it is assumed that the focus position moves from a point FP2 to a point FP1 on a nearest end side. In this case, the angle of view changes from FA2 to FA1, and is reduced by the difference. That is, a range to be imaged is reduced. Accordingly, in this case, the fluctuation of the angle of view can be cancelled by subjecting image data to reduction processing by a reduced amount of the angle of view.

In the example shown in FIG. 7, it is assumed that the focus position moves from the point FP2 to a point FP3 on an infinity side. In this case, the angle of view changes from FA2 to FA3, and is magnified by the difference. That is, the range to be imaged is magnified. Accordingly, in this case, the fluctuation of the angle of view can be cancelled by subjecting image data to magnification processing by a magnified amount of the angle of view.

Figure 8:
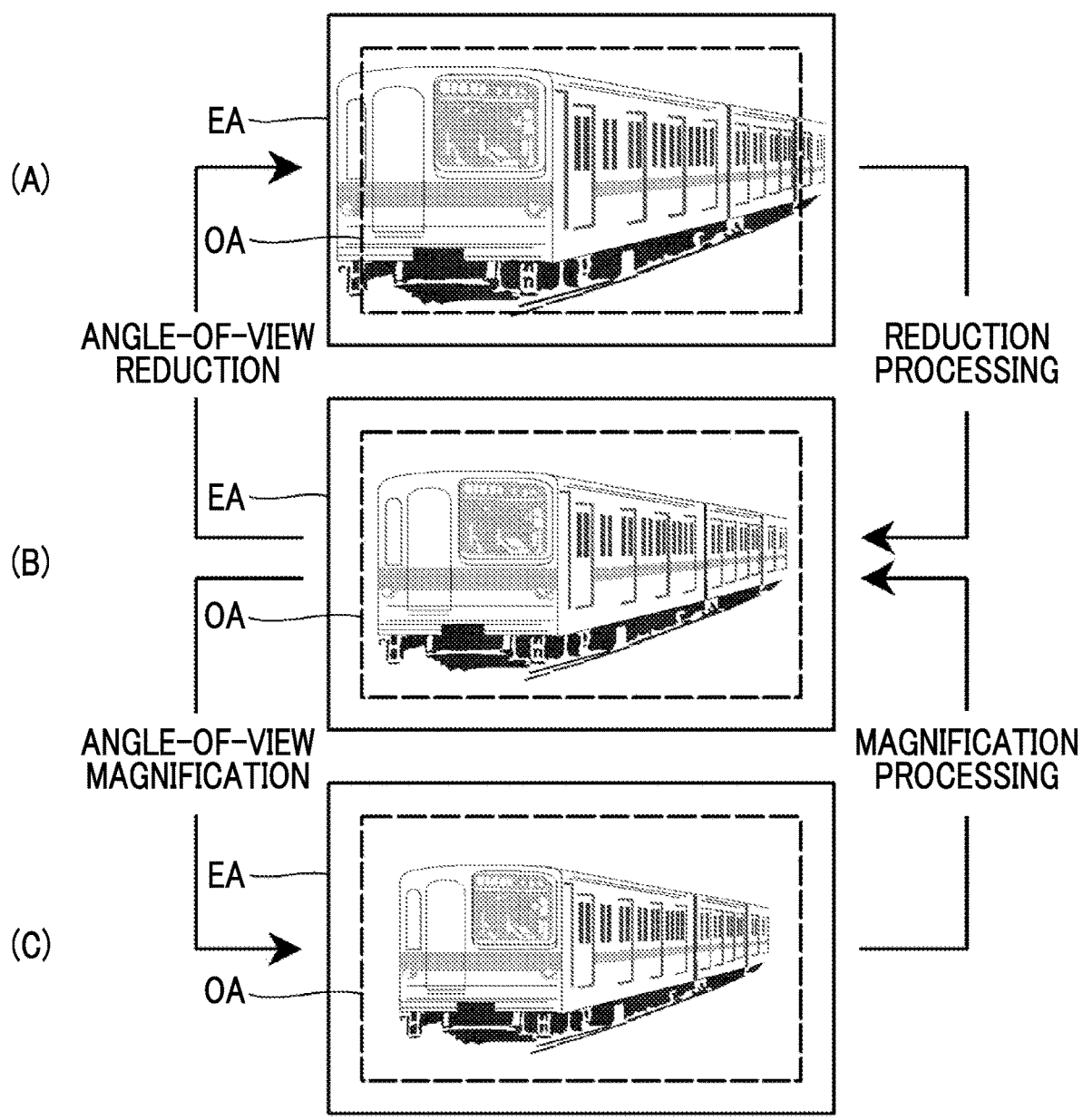
FIG. 8 is a conceptual diagram of angle-of-view correction through magnification and reduction processing.

FIG. 8 is a conceptual diagram of angle-of-view correction through the magnification and reduction processing. (A) of FIG. 8 shows an example of a source image (an image represented by source image data) in a case where the angle of view of output image data is reduced with respect to the reference angle of view. (B) of FIG. 8 shows an example of the source image in a case where the angle of view of output image data is the reference angle of view. (C) of FIG. 8 shows an example of the source image in which the angle of view of output image data is magnified with respect to the reference angle of view. In (A) to (C) of FIG. 8, an area inside a frame EA indicated by a solid line is an effective area, and an area inside a frame OA indicated by a broken line is an output area.

As shown in (A) of FIG. 8, in a case where the angle of view of output image data is reduced smaller than the reference angle of view with focus breathing, the source image is magnified. In this case, source image data is subjected to the reduction processing, and the angle of view of output image data is corrected to the reference angle of view.

As shown in (C) of FIG. 8, in a case where the angle of view of output image data is magnified greater than the reference angle of view with focus breathing, the source image is reduced. In this case, source image data is subjected to the magnification processing, and the angle of view of output image data is corrected to the reference angle of view.

In this way, source image data is subject to the magnification and reduction processing, whereby it is possible to correct the fluctuation of the angle of view of output image data, and to correct focus breathing.

The angle-of-view correction unit 120C subjects image data to the magnification and reduction processing depending on the focus position, thereby correcting the fluctuation of the angle of view of output image data, and correcting focus breathing.

Here, a target that is subjected to the magnification and reduction processing in the angle-of-view correction unit 120C is source image data. Source image data is subjected to the magnification and reduction processing, whereby output image data that is extracted from the source image data is also subjected to the magnification and reduction processing.

The angle-of-view correction unit 120C subjects source image data to the magnification and reduction processing at the magnification/reduction rate determined for each focus position, and maintains the angle of view of output image data constant. It is assumed that the angle of view maintained constant is a reference angle of view. The reference angle of view is determined for each focal length. That is, the angle-of-view correction unit 120C subjects source image data to the magnification and reduction processing so as to maintain the reference angle of view determined for each focal length. Accordingly, the magnification/reduction rate is prescribed as information regarding to a correction amount of the angle of view for correction to the reference angle of view. The magnification/reduction rate is determined for each focus position at each focal length. In the angle-of-view correction information storage unit 120D, information regarding the magnification/reduction rate determined for each focus position at each focal length is stored as information regarding the correction amount of the angle of view.

The magnification/reduction rate determined for each focus position changes with a manner of setting of the reference angle of view. How to set the reference angle of view at each focal length will be described below.

The angle-of-view correction unit 120C refers to information stored in the angle-of-view correction information storage unit 120D and decides the magnification/reduction rate based on the current focus position and focal length. The angle-of-view correction unit 120C subjects source image data to the magnification and reduction processing at the decided magnification/reduction rate to correct the angle of view of output image data.

Information regarding the current focus position and focal length is acquired from the imaging apparatus body control unit 140. The imaging apparatus body control unit 140 acquires information regarding the current focus position and focal length from the imaging lens 10A. For this reason, the imaging apparatus body control unit 140 comprises a function of acquiring information regarding the current focus position from the imaging lens 10A and a function of acquiring information regarding the current focal length.

As shown in FIG. 6, the function of acquiring information regarding the current focus position from the imaging lens 10A is provided by the focus position information acquisition unit 140D, and the function of acquiring information regarding the current focal length is provided by the focal length information acquisition unit 140E.

The focus position information acquisition unit 140D performs communication with the lens control unit 40 to acquire information regarding the position of the first-b lens group G1*b* (information regarding the position of the focusing lens group) from the lens control unit 40. The focus position information acquisition unit 140D specifies the focus position based on the acquired information regarding the position of the first-b lens group G1*b* and outputs information regarding the specified focus position to the angle-of-view correction unit 120C.

The focal length information acquisition unit 140E performs communication with the lens control unit 40 to acquire information regarding the position of the second lens group G2 (information regarding the position of the zoom lens) from the lens control unit 40. The focal length information acquisition unit 140E specifies the focal length based on the acquired information regarding the position of the second lens group G2 and outputs information regarding the specified focal length to the angle-of-view correction unit 120C.

The angle-of-view correction unit 120C acquires information regarding the current focus position and focal length from the imaging apparatus body control unit 140, decides the magnification/reduction rate based on information stored in the angle-of-view correction information storage unit 120D, and subjects source image data to the magnification and reduction processing at the decided magnification/reduction rate to correct the angle of view of output image data.

In the angle-of-view correction unit 120C, a case where the reduction processing can be executed is limited to a case where the output area is set to be smaller than the effective area. Since the reduction processing is processing for magnifying the angle of view, in a case where there is no image having an angle of view greater than the angle of view of the output area, the image cannot be reduced. For this reason, a case where the reduction processing can be executed is limited to a case where the output area is set to be smaller than the effective area.

<Image Output Unit>

The image output unit 120E extracts image data of the output area from source image data after angle-of-view correction as output image data.

Figure 9:
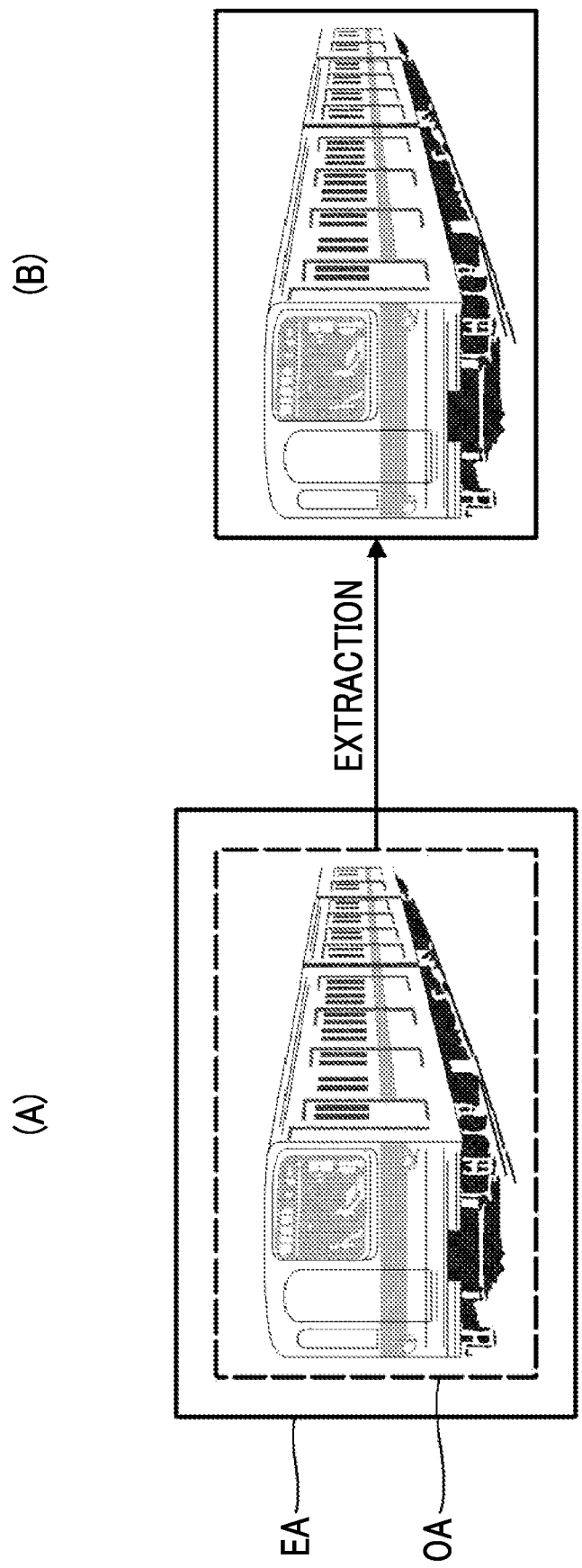
FIG. 9 is a conceptual diagram of image extraction in an image output unit.

FIG. 9 is a conceptual diagram of image extraction in the image output unit. (A) of FIG. 9 shows an example of a source image, and (B) of FIG. 9 shows an example of an output image.

In (A) of FIG. 9, an area inside a frame EA indicated by a solid line is an effective area, and an area inside a frame OA indicated by a broken line is an output area.

As shown in (A) and (B) of FIG. 9, the image output unit 120E extracts image data of the output area OA from source image data after angle-of-view correction as output image data.

In an example shown in FIG. 9, although a case where the output area OA is smaller than the effective area EA is shown, in a case where the output area OA coincides with the effective area EA, image data of the effective area EA, that is, source image data is output as output image data as it is.

Extracted output image data is output from the image output terminal 132 and is applied to the image display unit 130 to be reproduced and displayed.

<<Setting of Reference Angle of View>>

The reference angle of view can be set, for example, as follows. That is, a minimum angle of view or a maximum angle of view out of the angle of view of output image data (image data of the output area) fluctuating with focusing is set as the reference angle of view at each focal length. Hereinafter, a case where the minimum angle of view is set as the reference angle of view and a case where the maximum angle of view is set as the reference angle of view will be described, respectively.

<Case where Minimum Angle of View is Set as Reference Angle of View>

The minimum angle of view out of the angle of view of output image data fluctuating with focusing is set as the reference angle of view at each focal length. In this case, even in a case where the angle of view fluctuates with focusing, the angle of view of output image data does not fall below the reference angle of view. That is, a lower limit of fluctuation becomes the reference angle of view.

In this case, the angle-of-view correction unit 120C constantly subjects source image data to the magnification processing to correct the angle of view of output image data. That is, in the present example, the angle of view of output image data constantly changes in a magnifying direction from the reference angle of view. Accordingly, the angle-of-view correction unit 120C subjects source image data to the magnification processing in order to return the angle of view magnified from the reference angle of view to the reference angle of view.

In a case where the reduction processing cannot be executed on source image data, such as a case where the output area coincides with the effective area, as in the present example, the reference angle of view is set, whereby it is possible to appropriately correct focus breathing at all focus positions and focal lengths.

In the present example, the "minimum angle of view" also includes a near angle of view. That is, the term "minimum angle of view" is a concept including an angle of view (=about the minimum angle of view) within a range to be regarded as a minimum.

In a case where the minimum angle of view out of the angle of view of output image data fluctuating with focusing is set as the reference angle of view at each focal length, in the angle-of-view correction information storage unit 120D, information regarding the magnification/reduction rate for correction to the reference angle of view is stored as information regarding the correction amount at each focus position. The information is stored for each focal length.

<Case where Maximum Angle of View is Set as Reference Angle of View>

The maximum angle of view out of the angle of view of image data of the output area fluctuating with focusing is set as the reference angle of view at each focal length. In this case, even in a case where the angle of view fluctuates with focusing, the angle of view of output image data does not exceed the reference angle of view. That is, an upper limit of fluctuation becomes the reference angle of view.

In this case, the angle-of-view correction unit 120C constantly subjects source image data to the reduction processing to correct the angle of view of output image data. That is, in the present example, the angle of view of output image data constantly changes in a reducing direction from the reference angle of view. Accordingly, the angle-of-view correction unit 120C subjects source image data to the reduction processing in order to return the angle of view reduced from the reference angle of view to the reference angle of view.

In a case where the output area is set to be smaller than the effective area, there is a blank area around the output area, and source image data can be subjected to the reduction processing at all focus positions and focal lengths, the reference angle of view is set as in the present example, whereby it is possible to appropriately correct focus breathing at all focus positions and focal lengths.

As in the present example, the angle of view is constantly corrected through the reduction processing, whereby it is possible to restrain deterioration of output image data. That is, while the correction through the magnification processing causes degradation of image quality, such as deterioration of an MTF, the correction through the reduction processing has no harmful influence. Thus, the angle of view is constantly corrected through the reduction processing, whereby it is possible to restrain deterioration of output image data.

In the present example, the "maximum angle of view" also includes a near angle of view. That is, the term "maximum angle of view" is a concept including an angle of view (=about the maximum angle of view) within a range to be regarded as a maximum.

In a case where the maximum angle of view out of the angle of view of output image data fluctuating with focusing is set as the reference angle of view at each focal length, in the angle-of-view correction information storage unit 120D, information regarding the magnification/reduction rate for correction to the reference angle of view is stored as information regarding the correction amount at each focus position. The information is stored for each focal length.

<Selection Criterion>

Determination regarding whether the reference angle of view is set to the minimum angle of view or the maximum angle of view is primarily performed by the relationship between the effective area and the output area.

In a case where the output area coincides with the effective area, or the like, since the reduction processing cannot be executed, the minimum angle of view is inevitably set as the reference angle of view. Even in a case where the output area is set to be smaller than the effective area, in a case where there is no margin to such an extent that the angle of view cannot be corrected, similarly, the minimum angle of view is set as the reference angle of view.

In a case where the output area is set with a margin, and the angle of view can be corrected through the reduction processing even at any focus position and focal length, it is preferable that the maximum angle of view is set as the reference angle of view. With this, it is possible to restrain image deterioration, and to provide a high quality output image.

[Action]

Next, the operation of the imaging apparatus of the embodiment will be described.

<<Initial Setting>>

In a case where the imaging lens 10A is mounted in the imaging apparatus body 100, the processing for setting the effective area and the output area is executed in the imaging apparatus body control unit 140.

Figure 10:
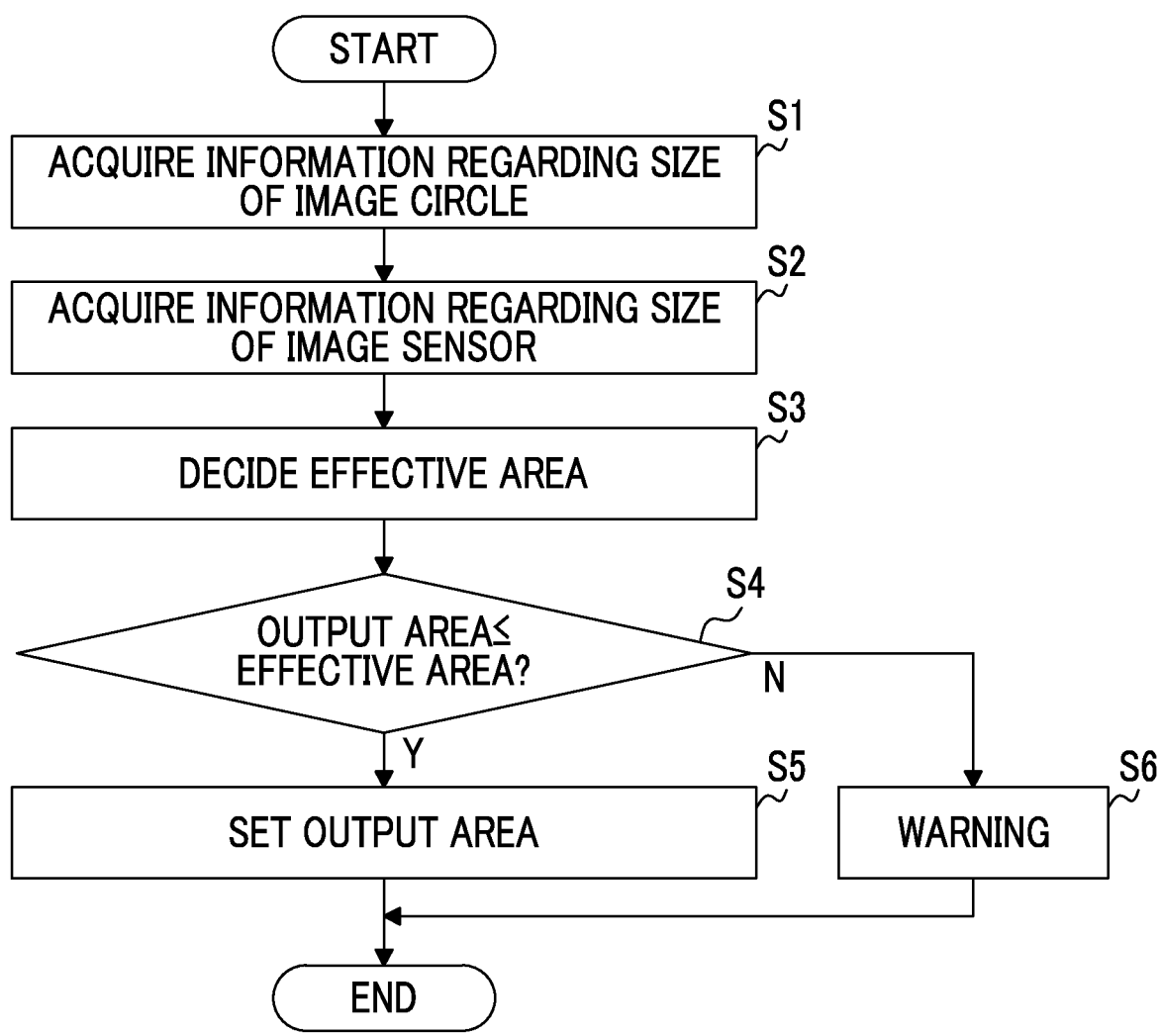
FIG. 10 is a flowchart showing a procedure of setting processing of the effective area and the output area.

FIG. 10 is a flowchart showing a procedure of the setting processing of the effective area and the output area.

First, the imaging apparatus body control unit 140 acquires information regarding the size of the image circle from the imaging lens 10A (Step S1). The imaging apparatus body control unit 140 performs communication with the lens control unit 40 to acquire the lens information from the lens control unit 40 and acquires information regarding the size of the image circle of the imaging lens 10A.

Next, the imaging apparatus body control unit 140 acquires information regarding the size of the image sensor 110 (Step S2). Information regarding the size of the image sensor 110 is acquired from the ROM. As described above, the size of the image sensor 110 becomes the size of the effective pixel area of the image sensor 110.

Next, the imaging apparatus body control unit 140 decides the effective area based on the acquired information regarding the size of the image circle and information regarding the size of the image sensor 110 (Step S3).

As described above, in a case where the size of the image circle of the imaging lens 10A is greater than the size of the image sensor 110 (the size of the effective pixel area), the effective area is set to the same area as the effective pixel area (see FIG. 5A). That is, the effective pixel area of the image sensor 110 is set as the effective area.

In a case where the size of the image circle of the imaging lens 10A is smaller than the size of the image sensor 110 (the size of the effective pixel area), the effective area is set inside the effective pixel area and is set inside the image circle (see FIG. 5B). In this case, the effective area is set in a predetermined aspect ratio and is set in as large a size as possible.

Next, the imaging apparatus body control unit 140 determines whether or not the output area to be set is equal to or less than the effective area (Step S4). Information regarding the output area to be set is read and acquired from the ROM.

In a case where the output area to be set is equal to or less than the effective area, the imaging apparatus body control unit 140 sets the output area to a determined area (Step S5).

In a case where the output area to be set exceeds the effective area, the imaging apparatus body control unit 140 issues a warning (Step S6). The warning is performed, for example, by displaying a warning message on the image display unit 130. The user copes based on the warning message.

The effective area and the output area are set by the above-described a series of steps. Information regarding the set effective area is output to the source image data generation unit 120B. Information regarding the set output area is output to the image output unit 120E.

<<Correction Processing of Focus Breathing>>

Next, the operation of correction processing of focus breathing that is executed during imaging by the imaging apparatus 1 of the embodiment will be described.

Figure 11:
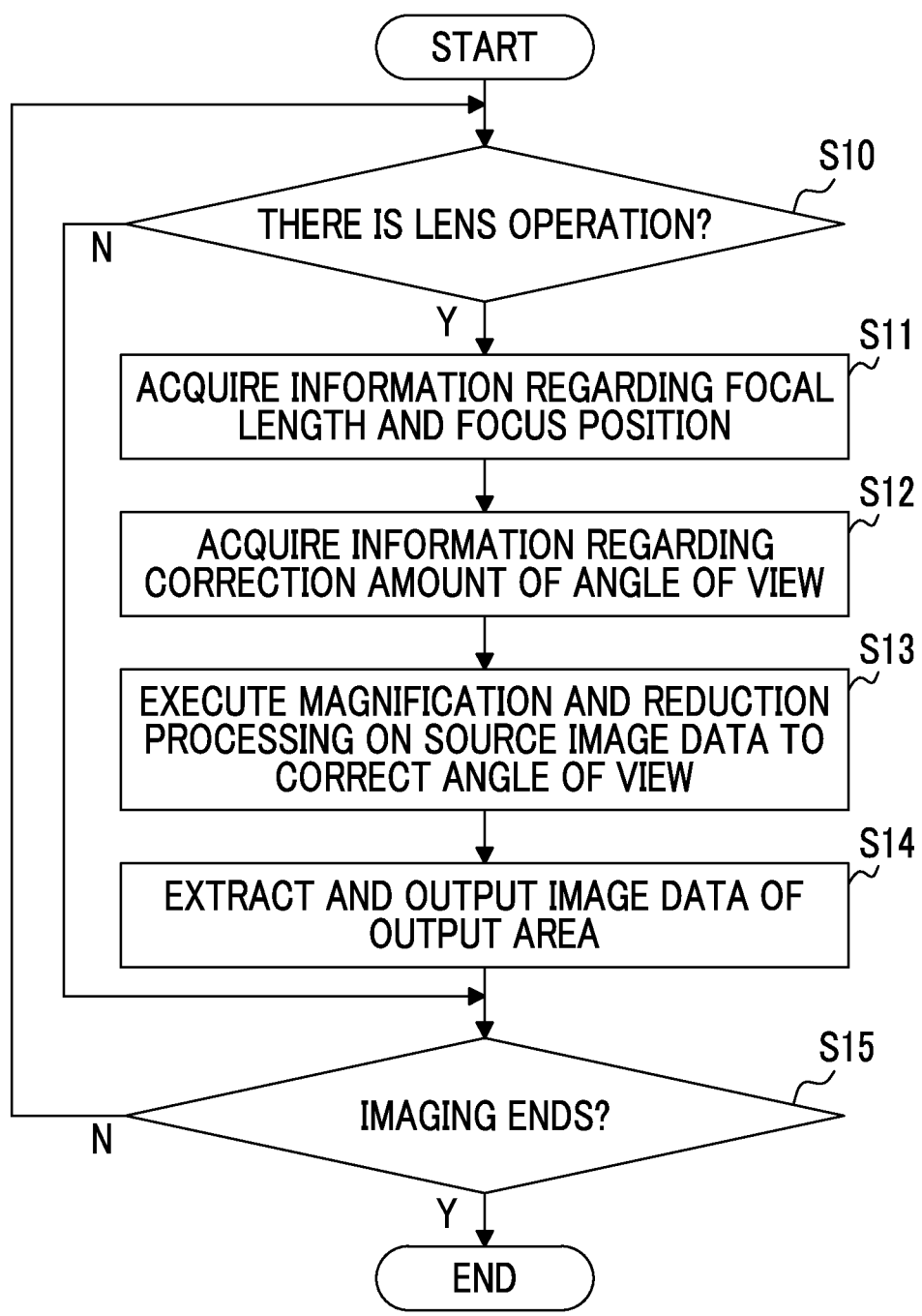
FIG. 11 is a flowchart showing a procedure of correction processing of focus breathing that is executed during imaging.

FIG. 11 is a flowchart showing a procedure of the correction processing of focus breathing that is executed during imaging.

First, the presence or absence of a lens operation is determined (Step S10). Here, the lens operation is a focus operation and a zoom operation on the imaging lens 10A.

In a case where there is the lens operation, the imaging apparatus body control unit 140 acquires information regarding the focus position and information regarding the focal length from the imaging lens 10A (Step S11). After the acquisition, the imaging apparatus body control unit 140 outputs the acquired information regarding the focus position and information regarding the focal length to the angle-of-view correction unit 120C.

The angle-of-view correction unit 120C acquires information regarding the correction amount of the angle of view from the angle-of-view correction information storage unit 120D based on information regarding the focus position and information regarding the focal length output from the imaging apparatus body control unit 140 (Step S12). That is, information regarding the magnification/reduction rate for correcting the angle of view to the reference angle of view through the magnification and reduction processing is acquired.

The angle-of-view correction unit 120C subjects source image data to the magnification and reduction processing at the magnification/reduction rate acquired from the angle-of-view correction information storage unit 120D and corrects the angle of view of image data of the output area to the reference angle of view (Step S13).

Source image data subjected to angle-of-view correction is applied to the image output unit 120E. The image output unit 120E extracts image data of the output area from source image data after angle-of-view correction. The image output unit 120E outputs extracted image data to the image display unit 130 and the image output terminal 132 as output image data (Step S14).

Thereafter, the imaging apparatus body control unit 140 determines whether or not imaging ends (Step S15). In a case where imaging does not end, the process returns to Step S10, and the above-described processing is executed again. In a case where imaging ends, the process ends.

[Effects]

With the imaging apparatus 1 of the embodiment, the imaging lens 10A as a zoom lens is composed of, arranged in order from the object side, the first lens group G1 that is fixed during variable magnification, the second lens group G2 and the third lens group G3 that move during variable magnification, and the fourth lens group (final lens group) G4 that is fixed during variable magnification, and the first lens group G1 as a focusing lens group is composed of, arranged in order from the object side, the first-a lens group G1a that is fixed during focusing, the first-b lens group G1b that moves during focusing, and the first lens group rear group G1c that is fixed during focusing. With this, it is possible to configure the imaging lens 10A with an unchanged total length through the focus operation and the zoom operation.

With the imaging apparatus 1 of the embodiment, focus breathing is corrected through the image processing, whereby it is possible to relax a restriction on the design value of focus breathing on the imaging lens side. That is, the occurrence of focus breathing is permitted to a certain extent on the imaging lens side. With this, it is possible to use power used to suppress focus breathing in terms of design for correction of other aberrations, and improvement of whole performance is achieved. Furthermore, with this, it is possible to satisfy performance needed for imaging of high pixels while satisfying focus breathing performance.

Modification Example

<<Reference Angle of View>>

The reference angle of view is determined for each focal length. In the above-described embodiment, a case where the minimum angle of view or the maximum angle of view out of the angle of view of output image data fluctuating with focusing is set as the reference angle of view at each focal length has been described as an example. A setting method of the reference angle of view is not limited thereto. For example, in a case where the output area is set to be smaller than the effective area, and the reduction processing can be executed, the reference angle of view can be set as follows. That is, a minimum angle of view out of an angle of view of the effective area fluctuating with focusing is set as the reference angle of view at each focal length. With this, it is possible to correct the angle of view through the reduction processing as much as possible. That is, a configuration in which the angle of view is corrected through the reduction processing in a case where the reduction processing can be executed, and the angle of view is corrected through the magnification processing only in a case where the reduction processing cannot be executed can be made.

Figure 12:
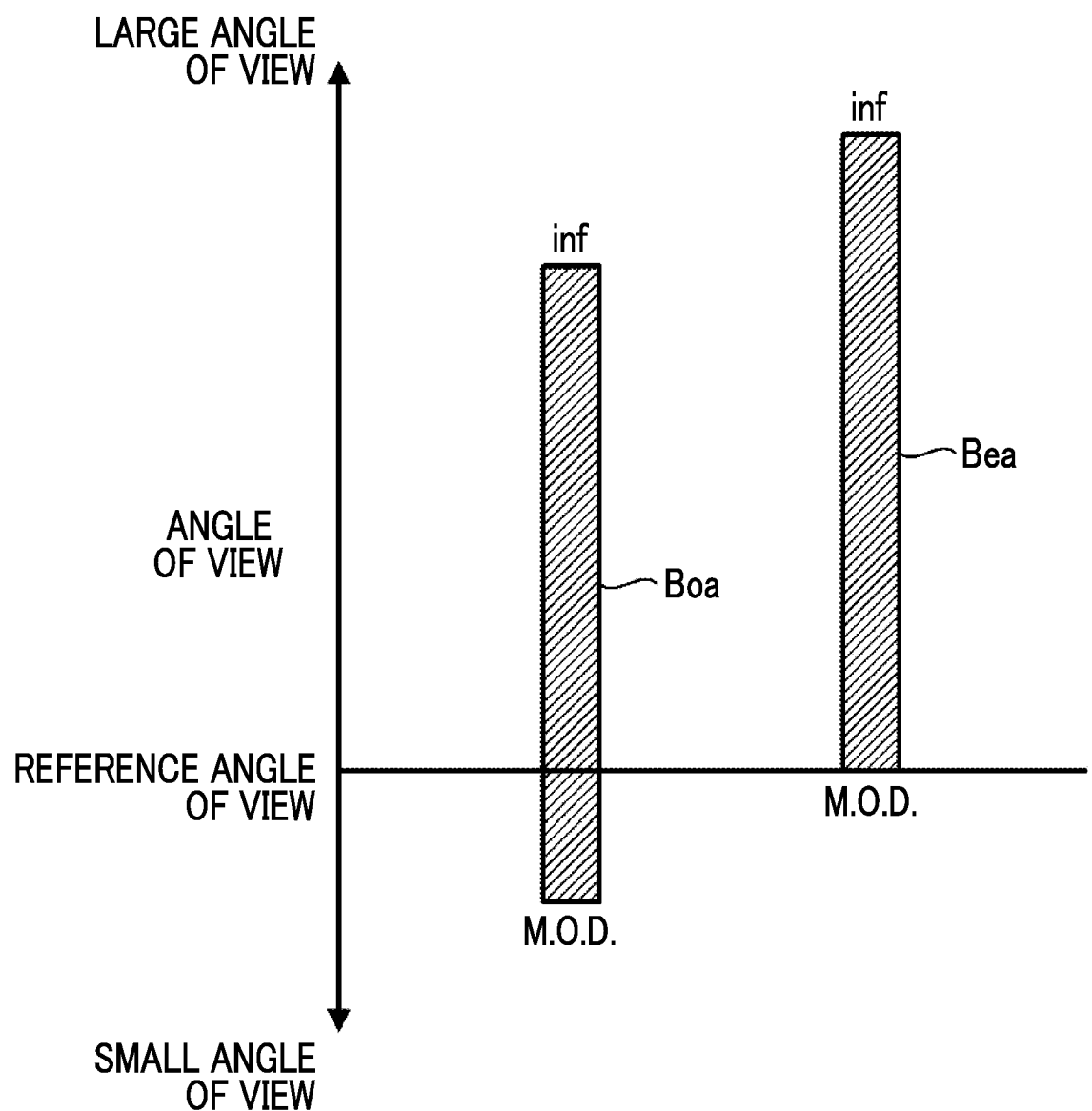
FIG. 12 is a conceptual diagram of setting in a case where a reference angle of view is set to a minimum angle of view out of an angle of view of the effective area fluctuating with focusing.

FIG. 12 is a conceptual diagram of setting in a case where the reference angle of view is set to the minimum angle of view out of the angle of view of the effective area fluctuating with focusing.

FIG. 12 shows fluctuation of the angle of view with focus breathing of the effective area and the output area at a certain focal length.

In FIG. 12, a bar Bea indicates a fluctuation range of the angle of view of the effective area in a case where the focus position is changed from a minimum object distance (M.O.D.) to an infinity end (inf: infinite). A bar Boa indicates a fluctuation range of the angle of view of the output area in a case where the focus position is changed from the minimum object distance to the infinity end. In an example shown in FIG. 12, for ease of understanding, a case where the angle of view is magnified monotonously in a case where the focus position is changed from the minimum object distance to the infinity end is shown as an example. In the example shown in FIG. 12, although an example where the angle of view of the infinity end (inf) is large and the angle of view of the minimum object distance (M.O.D.) is small has been described, the relationship is not necessarily a general relationship, and may be reversed. For this reason, appropriate substitution is needed.

As shown in FIG. 12, the reference angle of view is set to the minimum angle of view out of the angle of view of the effective area fluctuating with focusing.

The angle-of-view correction unit 120C subjects source image data to the magnification and reduction processing as follows to correct the angle of view of output image data. That is, in a case where the angle of view of output image data is reduced smaller than the reference angle of view with focusing, the angle of view of output image data is corrected through the reduction processing. In a case where the angle of view of output image data is magnified greater than the reference angle of view with focusing, the angle of view of output image data is corrected through the magnification processing. With this, it is possible to correct the fluctuation of the angle of view through the reduction processing as much as possible.

The angle of view of the effective area fluctuates with the focal length. Accordingly, the reference angle of view is determined for each focal length.

Figure 13:
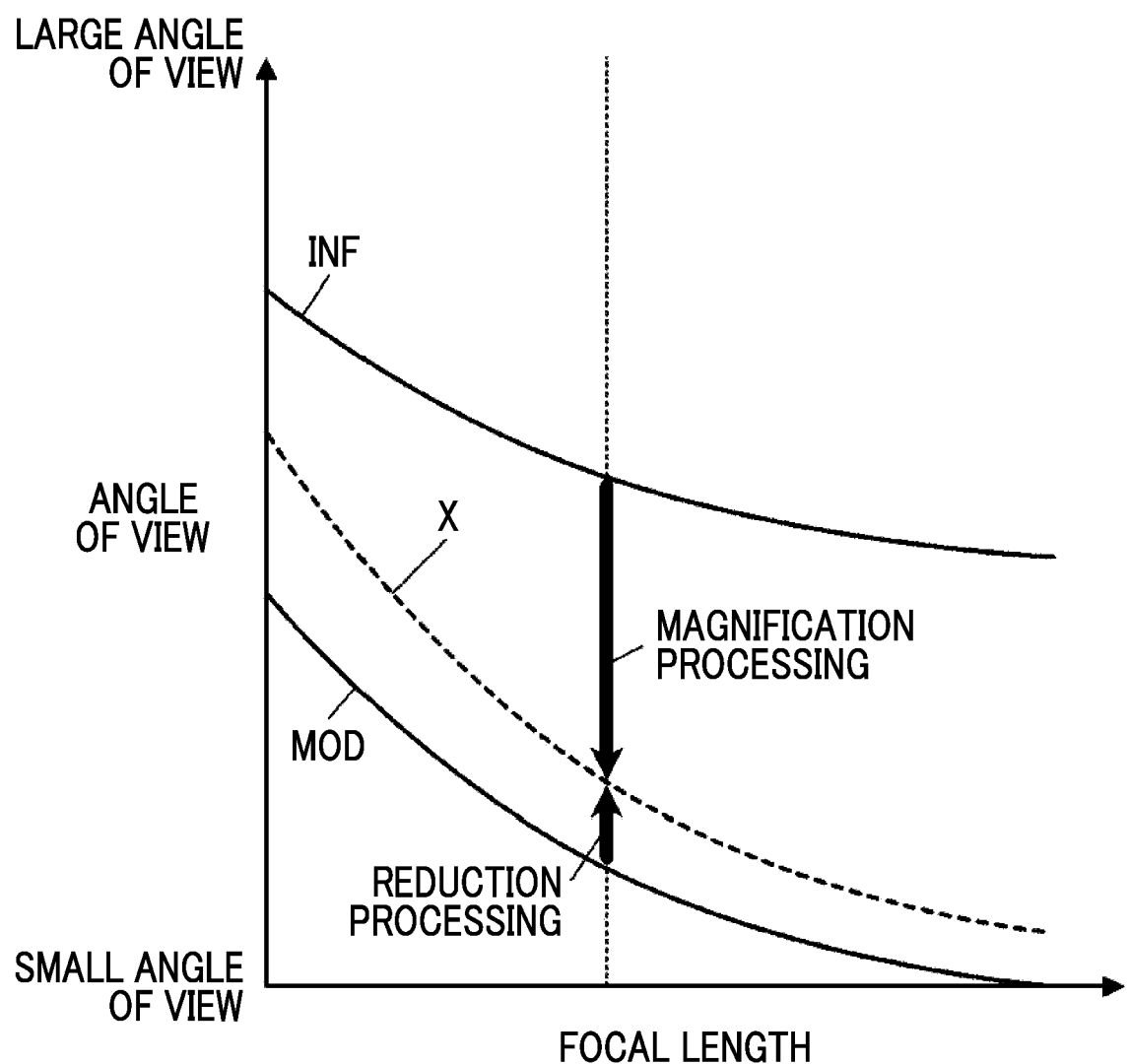
FIG. 13 is a conceptual diagram showing the relationship between the reference angle of view that is determined for each focal length and angle-of-view correction that is executed for each focal length.

FIG. 13 is a conceptual diagram showing the relationship between the reference angle of view that is determined for each focal length and angle-of-view correction that is performed for each focal length. In FIG. 13, the horizontal axis indicates the focal length, and the vertical axis indicates the fluctuation of the angle of view with focus breathing. In an example shown in FIG. 13, for ease of understanding, a case where the angle of view is monotonously magnified in a case where the focus position is changed from the minimum object distance to the infinity end at each focal length is shown as an example.

In FIG. 13, in a case where the focus position is changed from the minimum object distance to the infinity end at each focal length, the angle of view of output image data fluctuates within a range between a curve MOD and a curve INF. Here, the curve MOD shows the angle of view of output image data at the minimum object distance at the each focal length, and the curve INF shows the angle of view of output image data at the infinity end at each focal length. In FIG. 13, a curve X indicated by a broken line shows the reference angle of view at each focal length.

In a case where the angle of view of output image data becomes smaller than the reference angle of view X at each focal length, the angle-of-view correction unit 120C subjects source image data to the reduction processing to correct the angle of view of output image data to the reference angle of view.

In a case where the angle of view of output image data becomes greater than the reference angle of view X at each focal length, the angle-of-view correction unit 120C subjects source image data to the magnification processing to correct the angle of view of output image data to the reference angle of view.

In this way, in the present example, the reference angle of view is set based on the angle of view of the effective area. In a case where the output area coincides with the effective area, the angle of view is constantly corrected through the magnification processing.

The "minimum angle of view" also includes a near angle of view. That is, the term "minimum angle of view" is a concept including an angle of view within a range to be regarded as a minimum.

<<Output Area>>

The output area may be optionally set by the user. For example, means for setting the output area may be provided in the imaging apparatus body or the imaging lens, and the user may optionally set the output area manually. In this case, the user may select one from among a plurality of candidates prepared in advance to set the output area. Alternatively, the user may directly designate a numerical value to set the output area.

<<Acquisition Method of Information Regarding Size of Image Circle of Mounted Imaging Lens>>

In the above-described embodiment, although a configuration in which the imaging apparatus body performs communication with the imaging lens to acquire information regarding the size of the image circle of the imaging lens from the imaging lens has been made, a method of acquiring information regarding the size of the image circle of the mounted imaging lens is not limited thereto. For example, a configuration in which the imaging apparatus body stores a database of the imaging lenses, and acquires information regarding the size of the image circle of the mounted imaging lens with reference to the database may be made. In this case, in the database, individual information (for example, lens model name) of the imaging lens mountable in the imaging apparatus body is recorded in association with information regarding the size of the image circle of the imaging lens. The imaging apparatus body acquires the individual information of the mounted imaging lens from the imaging lens and acquires information regarding the size of the corresponding image circle with reference to the database. Alternatively, the individual information of the mounted imaging lens is acquired from the user, and information regarding the size of the corresponding image circle is acquired with reference to the database. The user inputs the individual information of the imaging lens to the imaging apparatus body using the operating unit in the imaging apparatus body.

The user may directly input information regarding the size of the image circle of the imaging lens mounted in the imaging apparatus body to the imaging apparatus body. The user inputs the individual information of the imaging lens to the imaging apparatus body using the operating unit in the imaging apparatus body.

<<Focal Length>>

Although the magnification/reduction rate in correcting focus breathing is set for each focus position and is set for each focal length, the focal length can be replaced with a zoom magnification (variable magnification ratio). For example, the focal length can be replaced with a zoom magnification based on the wide angle end. In this case, the magnification/reduction rate in correcting focus breathing is set for each focus position and is determined for each zoom magnification.

<<Drive System of Imaging Lens>>

In the above-described embodiment, although a configuration in which the first-b lens group G1$b$, the second lens group G2, and the third lens group G3 are driven with the motor has been made, a configuration in which the first-b lens group G1$b$, the second lens group G2, and the third lens group G3 are moved manually may be made (so-called manual focus or manual zoom).

In the above-described embodiment, although a configuration in which the second lens group G2 and the third lens group G3 are driven in an independent manner has been made, a configuration in which the second lens group G2 and the third lens group G3 may be driven with one drive source using a known cam mechanism.

<<Lens Configuration>>

The elements of the imaging lens can include a lens having substantially no power, optical elements, other than a lens, such as a stop and a cover glass, mechanism portions, such as a lens flange, a lens barrel, an imaging element, and a camera shake correction mechanism, and the like, in addition to the lens group and the lenses described above.

The lens group is not necessarily composed of a plurality of lenses, but may be composed of only one lens.

<<Signal Processing Unit>>

In regard to the signal processing unit 120, for example, the source image data generation unit 120B, the angle-of-view correction unit 120C, and the image output unit 120E can be configured of a microcomputer. In this case, the microcomputer is made to function as the source image data generation unit 120B, the angle-of-view correction unit 120C, and the image output unit 120E with a predetermined signal processing program.

In a case where the source image data generation unit 120B, the angle-of-view correction unit 120C, and the image output unit 120E are configured of a microcomputer, these units can be configured of one microcomputer along with the imaging apparatus body control unit 140.

<<Configuration in which Imaging Lens and Imaging Apparatus Body are Integrated>>

In the above-described embodiment, although the imaging lens is interchangeable with respect to the imaging apparatus body, the imaging lens may be integrally incorporated to be not interchangeable with respect to the imaging apparatus body.

<<Configuration in which Effective Area and Output Area are Set on Imaging Lens Side>>

In the above-described embodiment, although a configuration in which the imaging apparatus body sets the effective area and the output area has been made, a configuration in which the imaging lens sets the effective area and the output area may be made. In this case, the imaging lens comprises an imaging apparatus information acquisition unit that acquires information regarding the size of the image sensor from the imaging apparatus body in which the imaging lens is mounted, and an area setting unit that sets the effective area and the output area based on the acquired information regarding the size of the image sensor and information regarding the image circle of the imaging lens. The functions of the imaging apparatus information acquisition unit and the area setting unit can be provided as the functions of the lens control unit. Information regarding the image circle of the imaging lens can be stored in the ROM or the like of the lens control unit and can be read and acquired from the ROM.

In this case, the imaging apparatus body control unit acquires information regarding the effective area and the output area from the imaging lens and executes generation processing of source image data, angle-of-view correction processing, image output processing, and the like.

<<Focusing>>

As a focusing manner, a manner in which the focus position is changed in a stepwise manner may be employed.

Figure 14:
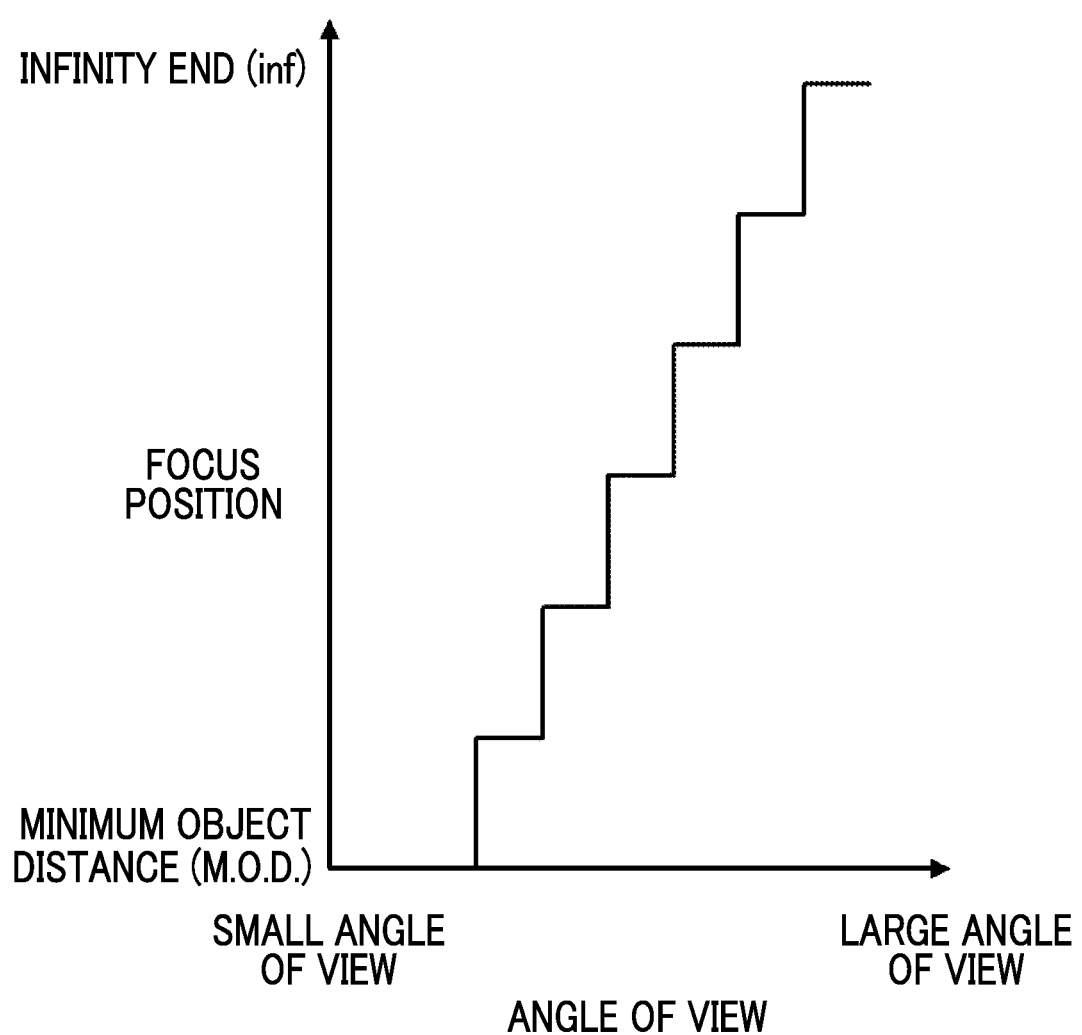
FIG. 14 is a graph showing the relationship between the focus position and the angle of view of output image data in a case where the focus position is changed in a stepwise manner.

FIG. 14 is a graph showing the relationship between focus position and the angle of view of output image data in a case where the focus position is changed in a stepwise manner.

In a case where the focus position is changed in a stepwise manner, the angle of view of output image data also changes in a stepwise manner. Even in this case, source image data is subjected to the magnification and reduction processing at the magnification/reduction rate determined for each focus position, and the angle of view of output image data is corrected to the reference angle of view.

Second Embodiment

An imaging apparatus of the embodiment uses a different imaging lens (zoom lens). Accordingly, here, only the lens configuration of the imaging lens will be described.

Figure 15:
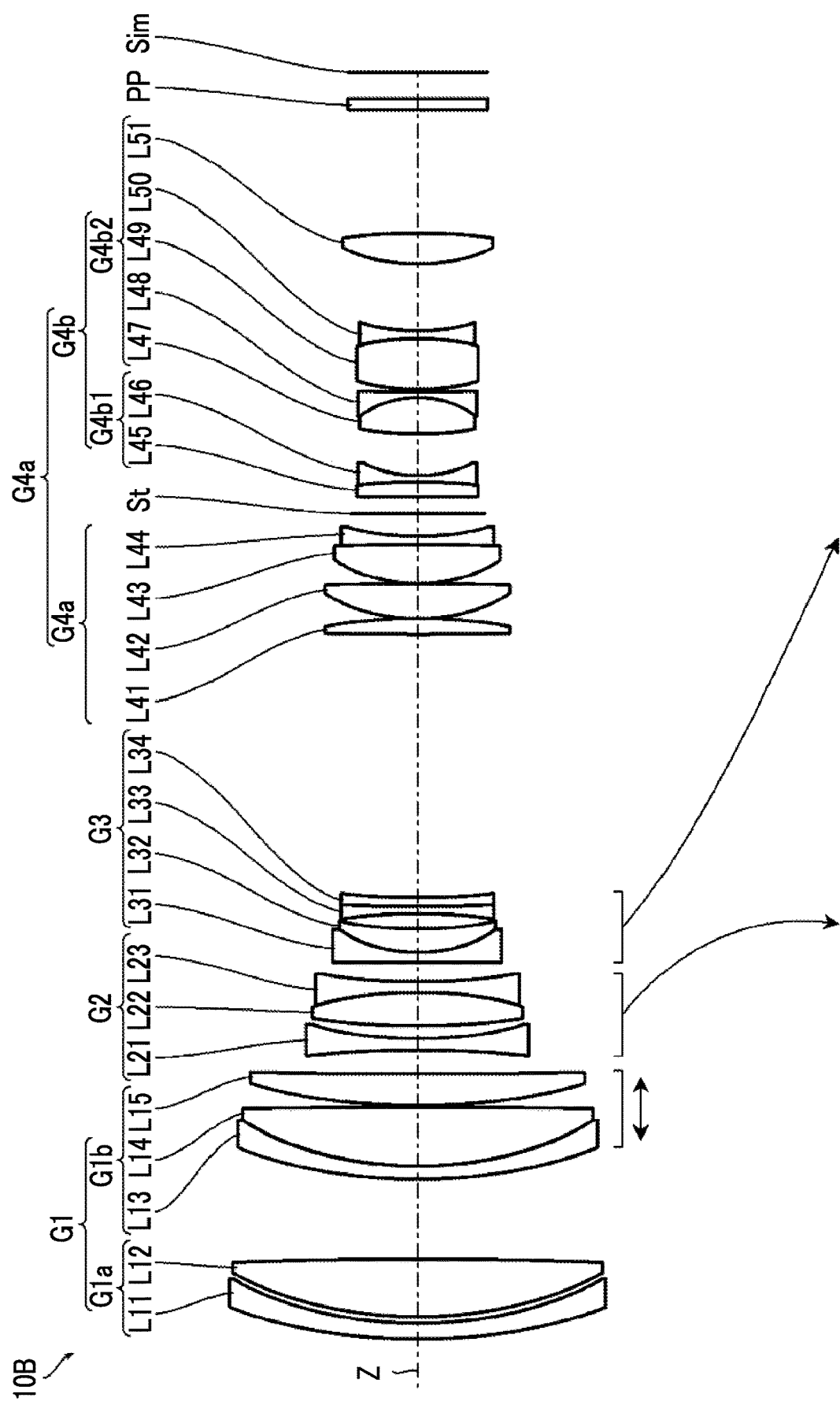
FIG. 15 is a sectional view showing the lens configuration of an imaging lens as a zoom lens.

FIG. 15 is a sectional view showing the lens configuration of the imaging lens as a zoom lens. In FIG. 15, the left side is the object side, and the right side is the image side. FIG. 15 shows lens arrangement at the wide angle end in a case where the object at infinity is brought into focus.

Figure 16A:
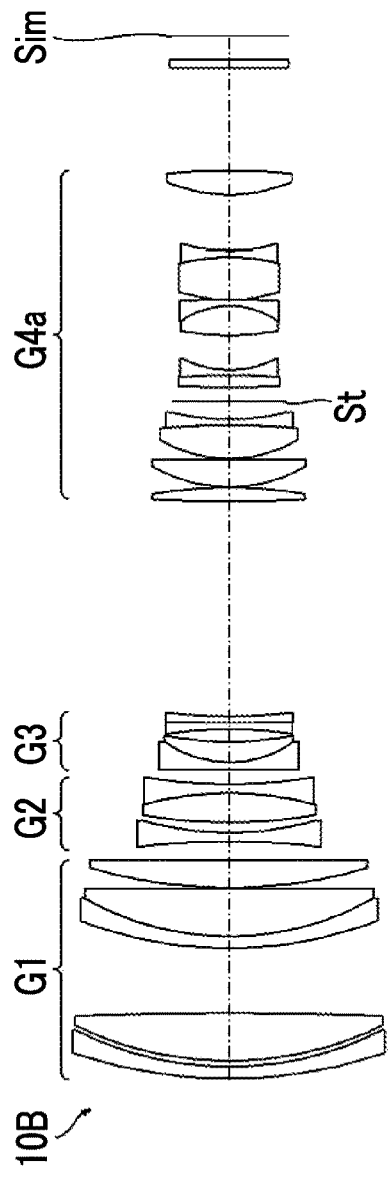
FIGS. 16A to 16C are diagrams showing a movement state of each lens in a case where the imaging lens shown in FIG. 15 is operated for variable magnification.
Figure 16B:
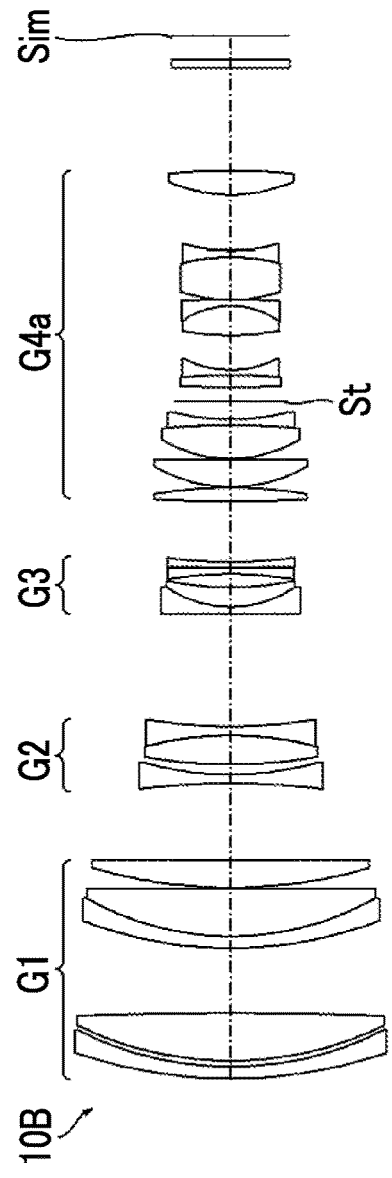
Figure 16C:
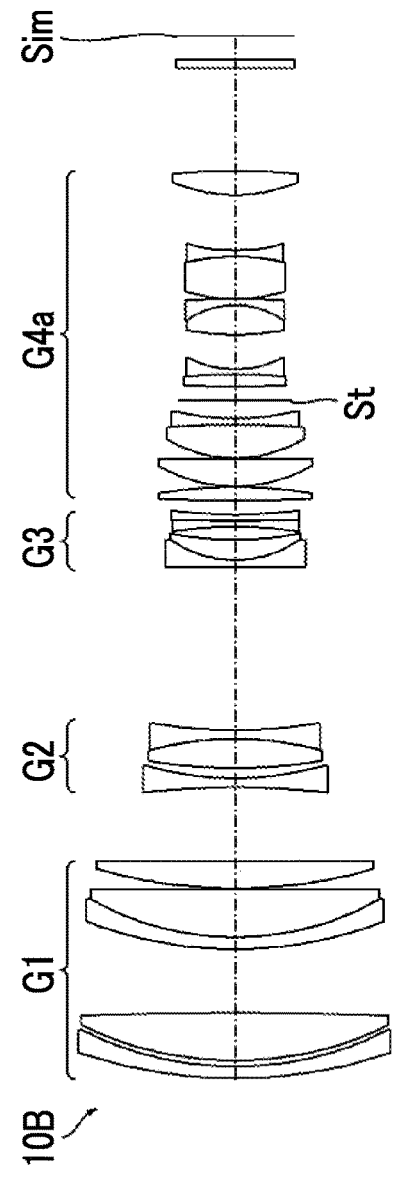

FIGS. 16A to 16C are diagrams showing a movement state of each lens in a case where the imaging lens shown in FIG. 15 is operated for variable magnification. FIGS. 16A to 16C show a movement state of each lens during variable magnification in a case where the object at infinity is brought into focus.

FIG. 16A shows lens arrangement at the wide angle end. FIG. 16B shows lens arrangement in the middle focal length state. FIG. 16C shows lens arrangement at the telephoto end.

As shown in FIG. 15, an imaging lens 10B of the embodiment is composed of, arranged in order from the object side along the optical axis Z, a first lens group G1 having positive refractive power, a second lens group G2 having negative refractive power, a third lens group G3 having negative refractive power, and a fourth lens group (final lens group) G4 having positive refractive power. In the imaging lens 10B of the embodiment, an aperture stop St is arranged in the fourth lens group G4. The aperture stop St shown in FIGS. 15 and 16A to 16C does not necessarily represent a size or a shape, and indicates a position on the optical axis Z.

In the imaging lens 10B, it is preferable that a cover glass and various filters, such as an infrared cut filter and a low-pass filter, are arranged between the optical system and the image plane Sim according to the configuration of the imaging apparatus body in which the imaging lens 10B is mounted. For this reason, in an example shown in FIGS. 15 and 16A to 16C, an example where a parallel flat plate-shaped optical member PP assumed to be an optical member is arranged between the lens system and the image plane Sim is shown.

In the imaging lens 10B of the embodiment, during variable magnification, the first lens group G1 and the fourth lens group G4 are fixed with respect to the image plane Sim, and the second lens group G2 and the third lens group G3 move. In regards to the second lens group G2 and the third lens group G3, during variable magnification from the wide angle end to the telephoto end, the third lens group G3 moves monotonously from the object side to the image side along the optical axis Z, and the second lens group G2 moves along the optical axis Z in order to correct image plane fluctuation accompanied by variable magnification. That is, in the imaging lens 10B of the embodiment, the third lens group G3 composes a variator lens group, and the second lens group G2 composes a compensator lens group. In FIG. 15, a movement locus of each lens group during variable magnification from the wide angle end to the telephoto end is schematically indicated by an arrow below each of the second lens group G2 and the third lens group G3.

In a four-group zoom lens in which a first lens group having positive refractive power, a second lens group having negative refractive power, a third lens group having positive or negative refractive power, and a fourth lens group having positive refractive power are arranged in order from the object side, usually, during variable magnification from the wide angle end to the telephoto end, the second lens group is moved from the object side to the image side as a variator lens group, and the third lens group is formed as a compensator lens group.

In contrast, in the imaging lens 10B of the embodiment, the third lens group G3 is formed as a variator lens group, and the second lens group G2 is formed as a compensator lens group, whereby it is possible to reduce the amount of movement of the second lens group G2 in the optical axis direction from the wide angle end to the telephoto end during variable magnification smaller than the four-group zoom lens having the above-described general configuration. As a result, it is possible to shift a rear-side principal point position (image-side principal point position) of an optical system, in which the first lens group G1 and the second lens group G2 are combined, at the telephoto end to the object side. With this, it is advantageous to reduce the total length of the lens system.

<<First Lens Group>>

The first lens group G1 is a lens group that composes the focusing lens group. The first lens group G1 is composed of, arranged in order from the object side, a first-a lens group G1a that is fixed with respect to the image plane Sim during focusing and has positive refractive power, and a first-b lens group G1b that moves during focusing and has positive refractive power.

The first-a lens group G1a is composed of, arranged in order from the object side, a lens L11 having a negative meniscus shape concave toward the image side, and a lens L12 having a biconvex shape.

The first-b lens group G1b is composed of, arranged in order from the object side, a lens L13 having a negative meniscus shape concave toward the image side, a positive lens L14 having a surface convex toward the object side, and a positive lens L15 having a surface convex toward the object side. The lens L13 and the lens L14 are cemented.

<<Second Lens Group and Third Lens Group>>

The second lens group G2 and the third lens group G3 are an example of a plurality of movable lens groups, and compose a zoom lens group. As described above, in regards to the second lens group G2 and the third lens group G3, the third lens group G3 composes a variator lens group, and the second lens group G2 composes a compensator lens group.

The second lens group G2 is composed of, arranged in order from the object side, a lens L21 having a biconcave shape in a paraxial area, a positive lens L22 having a surface convex toward the image side, and a negative lens L23 having a surface concave toward the object side. The lens L22 and the lens L23 are cemented. In the entire system, an aspheric surface is provided only in an object-side surface of the lens L21.

The third lens group G3 is composed of, arranged in order from the object side, a negative lens L31 having a surface concave toward the image side, a lens L32 having a positive meniscus shape convex toward the object side, a lens L33 having a biconcave shape, and a lens L34 having a negative meniscus shape concave toward the image side. The lens L31 and the lens L32 are cemented. The lens L33 and the lens L34 are cemented.

<<Fourth Lens Group>>

The fourth lens group G4 is an example of a final lens group. The fourth lens group G4 is composed of, arranged in order from the object side, a fourth-a lens group G4a having positive refractive power, an aperture stop St, and a fourth-b lens group G4b.

The fourth-b lens group G4b is composed of, arranged in order from the object side, a fourth-b1 lens group G4b1 that is fixed with respect to the image plane Sim during focusing of close-up imaging and has negative refractive power, and a fourth-b2 lens group G4b2 that moves during focusing of close-up imaging and has positive refractive power.

The fourth-a lens group G4a is composed of, arranged in order from the object side, a lens L41 having a biconvex shape, a positive lens L42 having a surface convex toward the object side, a lens L43 having a biconvex shape, and a lens L44 having a biconcave shape. The lens L43 and the lens L44 are cemented.

The fourth-b1 lens group G4b1 is composed of, arranged in order from the object side, a positive lens L45 having a surface convex toward the image side, and a lens L46 having a biconcave shape. The lens L45 and the lens L46 are cemented.

The fourth-b2 lens group G4b2 is composed of, arranged in order from the object side, a lens L47 having a biconvex shape, a negative lens L48 having a surface concave toward the object side, a lens L49 having a biconvex shape, a lens L50 having a biconcave shape, and a lens L51 having a biconvex shape. The lens L47 and the lens L48 are cemented. The lens L49 and the lens L50 are cemented.

Even in the imaging lens 10B of the embodiment, similarly to the imaging lens 10A of the first embodiment described above, it is possible to configure the zoom lens with an unchanged total length through the focus operation and the zoom operation.

In the imaging lens 10B of the embodiment, the third lens group G3 is formed as a variator lens group, and the second lens group G2 is formed as a compensator lens group, whereby it is possible to reduce the total length of the lens system.

In the imaging lens 10B of the embodiment, since the first lens group G1 is composed of two lens groups (first-a lens group G1a and first-b lens group G1b), it is possible to further reduce the total length and to make a more compact configuration compared to the imaging lens 10A of the first embodiment. Furthermore, since it is possible to reduce the number of lenses, it is possible to further reduce a weight.

Although the fluctuation of the angle of view accompanied by focusing increases compared to the imaging lens 10A of the first embodiment, since focus breathing can be corrected through the image processing, it is possible to capture a high quality image.

Third Embodiment

An imaging apparatus of the embodiment uses a different imaging lens (zoom lens). Accordingly, here, only the lens configuration of the imaging lens will be described.

Figure 17:
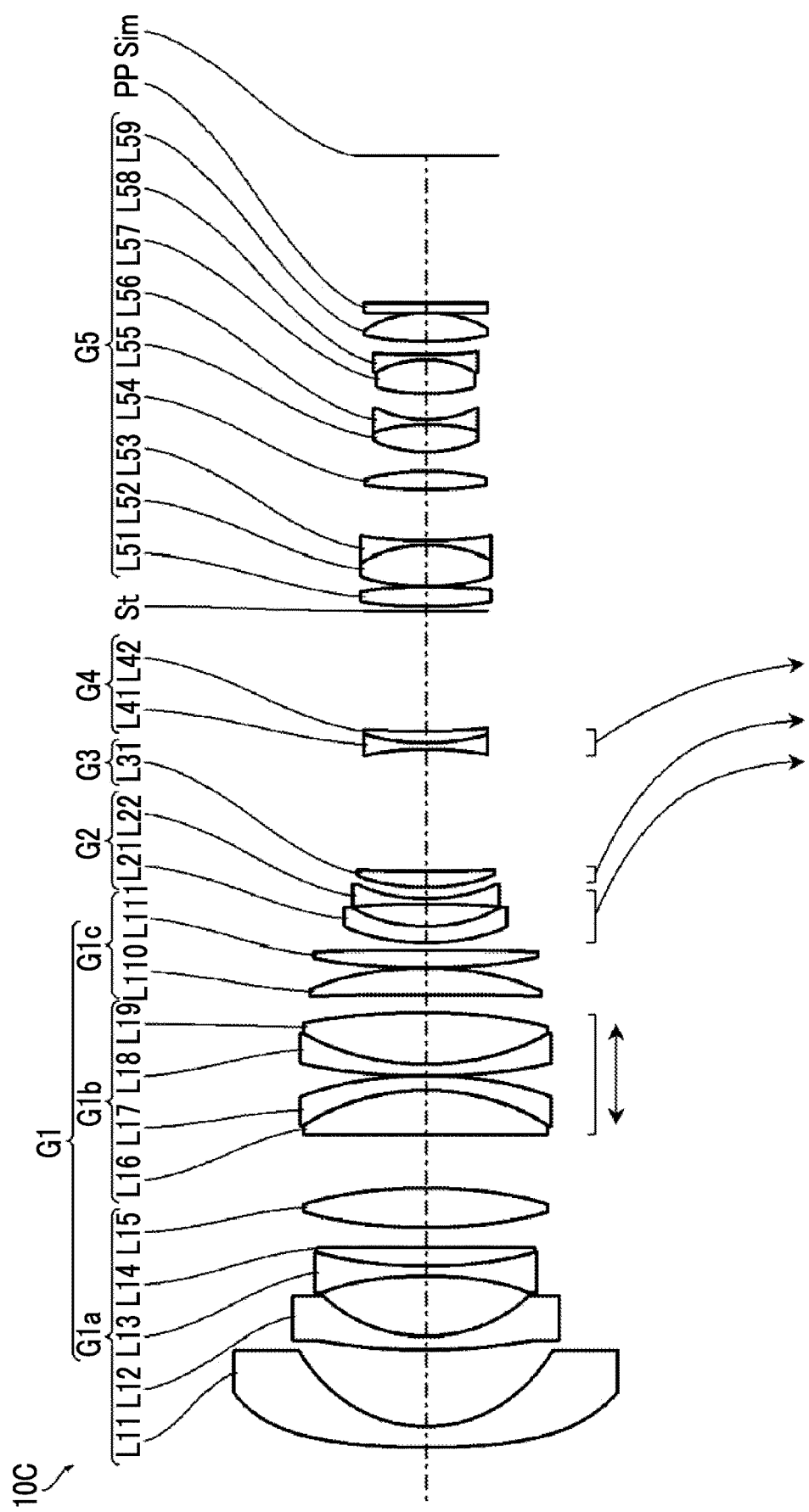
FIG. 17 is a sectional view showing the lens configuration of an imaging lens as a zoom lens.

FIG. 17 is a sectional view showing the lens configuration of the imaging lens that is a zoom lens. In FIG. 17, the left side is the object side, and the right side is the image side. FIG. 17 shows lens arrangement at the wide angle end in a case where the object at infinity is brought into focus.

Figure 18A:
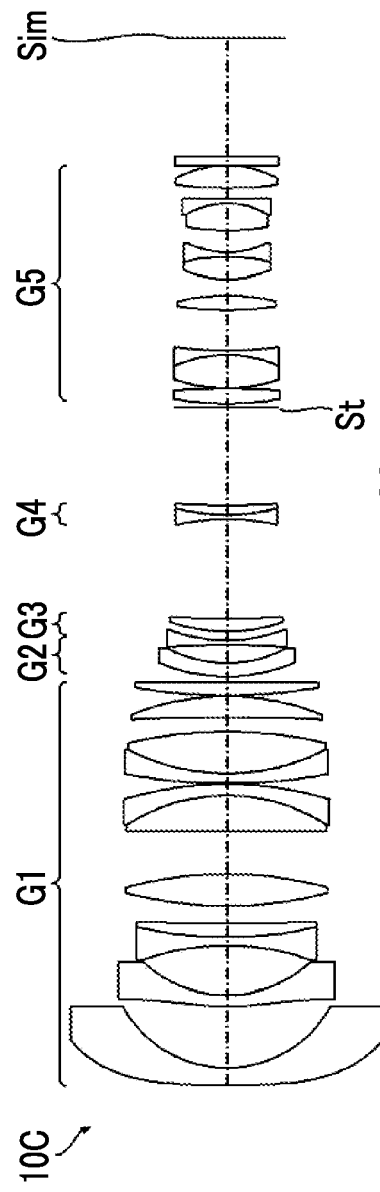
FIGS. 18A to 18C are diagrams showing a movement state of each lens in a case where the imaging lens shown in FIG. 17 is operated for variable magnification.
Figure 18B:
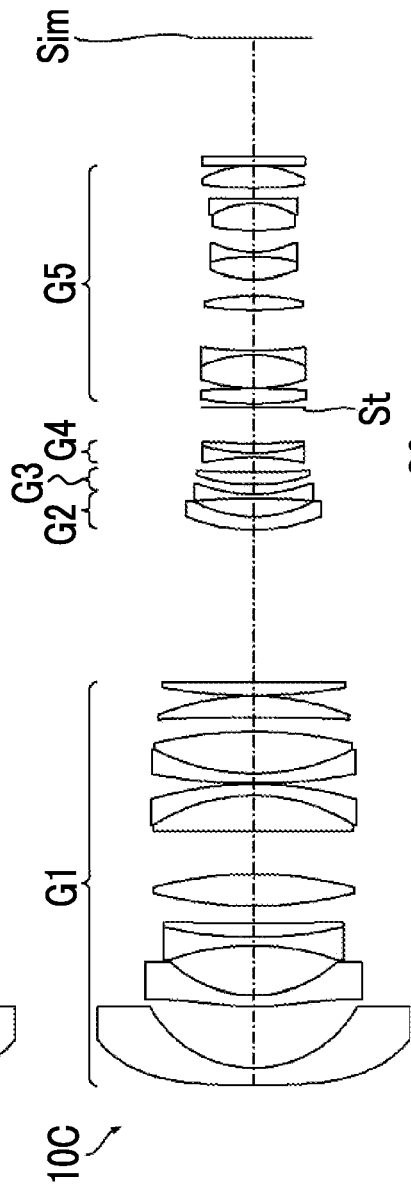
Figure 18C:
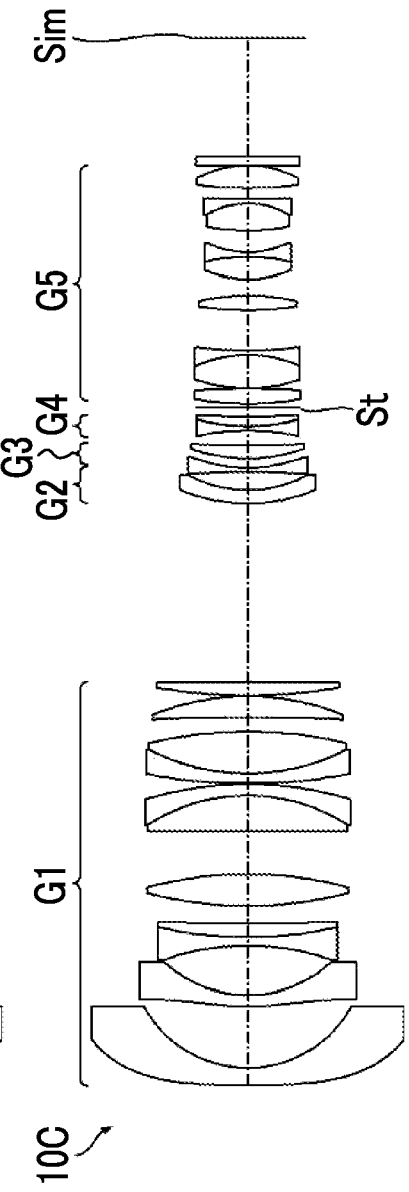

FIGS. 18A to 18C are diagrams showing a movement state of each lens in a case where the imaging lens shown in FIG. 17 is operated for variable magnification. FIGS. 18A to 18C show a movement state of each lens during variable magnification in a case where the object at infinity is brought into focus.

FIG. 18A shows lens arrangement at a wide angle end. FIG. 18B shows lens arrangement in a middle focal length state. FIG. 18C shows lens arrangement at a telephoto end.

An imaging lens 10C of the embodiment is a zoom lens having a five-group configuration in which a first lens group G1 that is fixed during variable magnification and has positive refractive power, a second lens group G2 that moves during variable magnification and has negative refractive power, a third lens group G3 that moves during variable magnification and has positive refractive power, a fourth lens group G4 that moves during variable magnification and has negative refractive power, and a fifth lens group (final lens group) G5 that is fixed during variable magnification and has positive refractive power are arranged in order from the object side along the optical axis Z. An aperture stop St shown in FIGS. 17 and 18A to 18C does not necessarily represent a size or a shape, and indicates a position on the optical axis Z.

In the imaging lens 10C, it is preferable that a cover glass and various filters, such as an infrared cut filter and a low-pass filter, are arranged between an optical system and an image plane Sim according to the configuration of the imaging apparatus body in which the imaging lens 10C is mounted. For this reason, in an example shown in FIGS. 17 and 18A to 18C, an example where a parallel flat plate-shaped optical member PP assumed to be an optical member is arranged between the lens system and the image plane Sim is shown.

The first lens group G1 is a focusing lens group. The first lens group G1 is composed of, arranged in order from the object side, a first-a lens group G1a having negative refractive power, a first-b lens group G1b having positive refractive power, and a first lens group rear group G1c having positive refractive power. The first lens group G1 is composed of such three lens groups, whereby it is possible to suppress the fluctuation of the angle of view accompanied by focusing.

The imaging lens 10C of the embodiment employs a so-called inner focus system, and in the imaging lens 10C, a lens group that is moved during focusing is only the first-b lens group G1b. In FIG. 17, a two-way arrow indicating that is described below the first-b lens group G1b.

The first-a lens group G1a is an example of a first-a lens group, and is a lens group that is fixed during focusing. The first-a lens group G1a is composed of, arranged in order from the object side, a lens L11, a lens L12, a lens L13, a lens L14, and a lens L15.

The first-b lens group G1b is an example of a first-b lens group, and is a lens group that moves during focusing. The first-b lens group G1b is composed of, arranged in order from the object side, a lens L16, a lens L17, a lens L18, and a lens L19. The lens L16 and the lens L17 are cemented. The lens L18 and the lens L19 are cemented.

The first lens group rear group G1c is a lens group that is fixed during focusing, and is composed of, arranged in order from the object side, a lens L110 and a lens L111.

The imaging lens 10C of the embodiment comprises, in order from the object side, a second lens group G2 having negative refractive power, a third lens group G3 having positive refractive power, and a fourth lens group G4 having negative refractive power as a plurality of movable lens groups. The second lens group G2 is composed of, arranged in order from the object side, a lens L21 and a lens L22. The third lens group G3 is composed of a lens L31. The fourth lens group G4 is composed of, arranged in order from the object side, a lens L41 and a lens L42. The lens L41 and the lens L42 are cemented.

The imaging lens 10C of the embodiment comprises, as a final lens group, a fifth lens group G5 that is fixed during variable magnification. The fifth lens group G5 is composed of, arranged in order from the object side, a lens L51, a lens L52, a lens L53, a lens L54, a lens L55, a lens L56, a lens L57, a lens L58, and a lens L59. The lens L52 and the lens L53 are cemented. The lens L55 and the lens L56 are cemented. The lens L57 and the lens L58 are cemented.

Even in the imaging lens 10C of the embodiment, similarly to the imaging lens 10A of the first embodiment described above, it is possible to configure the zoom lens with an unchanged total length through the focus operation and the zoom operation.

Even in the imaging lens 10C of the embodiment, similarly to the imaging lens 10A of the first embodiment described above, it is possible to relax a restriction on a design value of focus breathing. With this, it is possible to use power used to suppress focus breathing in terms of design for correction of other aberrations, and improvement of whole performance is achieved. Furthermore, with this, it is possible to satisfy performance needed for imaging of high pixels while satisfying focus breathing performance.

Other Embodiments

In the above-described embodiments, although the lens control unit 40 and the imaging apparatus body control unit 140 are configured of the microcomputer, a hardware configuration for implementing the lens control unit 40 and the imaging apparatus body control unit 140 is not limited thereto. The same applies to the respective processing units, such as the source image data generation unit 120B, the angle-of-view correction unit 120C, and the image output unit 120E. The control unit, the processing units, and the like can be configured of various processors. Various processors include a central processing unit (CPU) that is a general-purpose processor executing software (program) to function as various processing units, programmable logic devices (PLD) that are processors capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured of one of various processors described above or may be configured of a combination of two or more processors of the same type or different types. For example, one processing unit may be configured of a plurality of FPGAs or may be configured of a combination of a CPU and an FPGA.

A plurality of processing units may be configured of one processor. As an example where a plurality of processing units are configured of one processor, first, as represented by a computer, such as a client or a server, there is a form in which one processor is configured of a combination of one or more CPUs and software, and the processor functions as a plurality of processing units. Secondly, as represented by system on chip (SoC) or the like, there is a form in which a processor that implements all functions of a system including a plurality of processing units into one integrated circuit (IC) chip is used. In this way, various processing units may be configured using one or more processors among various processors described above as a hardware structure.

In addition, the hardware structure of various processors is, more specifically, an electric circuit (circuitry) in which circuit elements, such as semiconductor elements, are combined.

EXAMPLES

A numerical example of the imaging lens 10A of the first embodiment described above as Example 1, a numerical example of the imaging lens 10B of the second embodiment as Example 2, and a numerical example of the imaging lens 10C of the third embodiment as Example 3 will be described below.

Example 1

Various kinds of data of the imaging lens of Example 1 are shown in FIGS. 19 to 22.

In table shown in FIGS. 19 to 22, numerical values are rounded to a predetermined digit. In data of the tables shown in FIGS. 19 to 22, "degree" is used as the unit of angle, and "mm" is used as the unit of length. Note that other appropriate units may be used since optical systems are usable even though the optical systems are proportionally magnified or proportionally reduced.

FIG. 19 is a table showing basic lens data in a case where the imaging lens of Example 1 is focused on the object at infinity.

In the table shown in FIG. 19, a column "surface number" shows an i-th (where i=1, 2, 3, . . . ) surface number that sequentially increases toward the image side in a case where a surface of an element closest to the object side is regarded as a first surface. A column "radius of curvature" shows a radius of curvature of an i-th surface. A column "surface distance" shows a surface distance on the optical axis Z between the i-th surface and an (i+1)th surface. Note that a numerical value of a lowermost column of the surface distance shows a surface distance between a final surface in the table and the image plane Sim. A sign of the radius of curvature is positive in a case where the surface shape is convex toward the object side, and is negative in a case where the surface shape is convex toward the image side.

In the table shown in FIG. 19, a column "Nd" shows a refractive index of a j-th element (where j=1, 2, 3, . . . ) with respect to d line (a wavelength 587.6 nm) that sequentially increases in a case where a most object-side element is regarded as a first element. A column "vd" shows an Abbe number of the j-th element with respect to d line. A column "θg,F" shows a partial dispersion ratio of the j-th element between g line (a wavelength 435.8 nm) and f line. The partial dispersion ratio between g line and f line is represented by (Ng−NF)/(NF−NC) where a refractive index with respect to g line is Ng, a refractive index with respect to f line (a wavelength 486.1 nm) is NF, and a refractive index with respect to C line (a wavelength 656.3 nm) is NC.

Basic lens data shown in FIG. 19 also includes the aperture stop St and the optical members PP1 and PP2, and text reading (stop) is described in the column of the surface number of the surface corresponding to the aperture stop St.

The distance between the first lens group G1 and the second lens group G2, the distance between the second lens group G2 and the third lens group G3, and the distance between the third lens group G3 and the aperture stop St change during variable magnification, and in the table shown in FIG. 19, DD[16], DD[23], and DD[25] are described in the column of the surface distance corresponding to the distances.

In the table shown in FIG. 19, mark * is attached to the surface number of the aspheric surface, and a numerical value of a paraxial radius of curvature is shown as the radius of curvature of the aspheric surface.

FIG. 20 is a table showing specifications of the imaging lens of Example 1 at the wide angle end, the middle focal length state, and the telephoto end.

The table of the specifications shown in FIG. 20 shows values of a zoom magnification (variable magnification ratio), a focal length f' of the entire system, a back focus Bf' (air conversion distance), an F-Number FNo., and a half angle of view ω at the wide angle end, the middle focal length state, and the telephoto end of the imaging lens of Example 1. The values of the table of specifications shown in FIG. 20 relates to d line.

FIG. 21 is a table showing zoom distances of the imaging lens of Example 1 at the wide angle end, the middle focal length state, and the telephoto end.

The table of the zoom distances shown in FIG. 21 shows the values of the surface distances of DD[16], DD[23], and DD[25].

FIG. 22 is a table showing the surface numbers of the aspheric surfaces and aspheric coefficients of the aspheric surfaces of the imaging lens of Example 1.

"E−n" (where n: integer) in numerical values of the aspheric coefficients of the table shown in FIG. 22 means "×10$^{-n}$", and "E+n" (where n: integer) means "×10$^{n}$". The aspheric coefficients are the values of the coefficients KA and Am (where m=a coefficient of a fourth order or higher) in an aspheric surface expression described below.

$$Zd = \frac{C \times h^2}{1 + \sqrt{1 - KA \times C^2 \times h^2}} + \sum_m Am \times h^m$$

Here,

Zd: an aspheric surface depth (a length of a vertical line from a point on an aspheric surface at height h to a plane perpendicular to the optical axis in contact with an aspheric surface apex)

h: a height (a distance from the optical axis to the lens surface)

C: a reciprocal of a paraxial radius of curvature

KA, Am: aspheric coefficients (m=a coefficient of a fourth order or higher)

The imaging lens of Example 1 comprises, in order from the object side along the optical axis Z, a first lens group G1 having positive refractive power, a second lens group G2 having negative refractive power, a third lens group G3 having negative refractive power, and a fourth lens group G4 having positive refractive power. The imaging lens of Example 1 is configured such that, during variable magnification from the wide angle end to the telephoto end, the first lens group G1 and the fourth lens group G4 are fixed in the optical axis direction with respect to the image plane Sim, the second lens group G2 moves to the image side along the optical axis Z, and the third lens group G3 moves in the optical axis direction so as to correct fluctuation of the image plane with the movement of the second lens group G2.

The imaging lens of Example 1 is configured such that the first lens group G1 comprises, in order from the object side, three lens groups of a first-a lens group G1a having negative refractive power and consisting of, in order from the object side, two negative lenses and one positive lens, a first-b lens group G1b having positive refractive power, and a first lens group rear group G1c having positive refractive power, and only the first-b lens group G1b is moved in the optical axis direction to perform focusing.

FIG. 23 is a diagram of respective aberrations of the imaging lens of Example 1.

(A) to (D) of FIG. 23 show spherical aberration, astigmatism, distortion, and lateral chromatic aberration (chromatic aberration of magnification) of the imaging lens of Example 1 at the wide angle end.

(E) to (H) of FIG. 23 show spherical aberration, astigmatism, distortion, and lateral chromatic aberration of the imaging lens of Example 1 in the middle focal length state.

(I) to (L) of FIG. 23 show spherical aberration, astigmatism, distortion, and lateral chromatic aberration of the imaging lens of Example 1 at the telephoto end.

All of the aberration diagrams are aberration diagrams in a case where the object at infinity is brought into focus.

The aberration diagrams are based on d line. In the spherical aberration diagram, aberrations relating to g line and C line are also shown. In the lateral chromatic aberration diagram, aberrations relating to g line and C line based on d line are shown. In the astigmatism diagram, a sagittal direction is indicated by a solid line, and a tangential direction is indicated by a broken line. FNo. of the spherical aberration diagram means an F-Number, and ω in other aberration diagrams means a half angle of view.

Example 2

Various kinds of data of the imaging lens of Example 2 are shown in FIGS. 24 to 27.

Similarly to the imaging lens of Example 1, in the tables shown in FIGS. 24 to 27, numerical values are rounded to a predetermined digit. In data of the tables shown in FIGS. 24 to 27, "degree" is used as the unit of angle, and "mm" is used as the unit of length. Note that other appropriate units may be used since optical systems are usable even though the optical systems are proportionally magnified or proportionally reduced.

FIG. 24 is a table showing basic lens data in a case where the imaging lens of Example 2 is focused on the object at infinity.

FIG. 25 is a table showing specifications of the imaging lens of Example 2 at the wide angle end, the middle focal length state, and the telephoto end.

FIG. 26 is a table showing zoom distances of the imaging lens of Example 2 at the wide angle end, the middle focal length state, and the telephoto end.

FIG. 27 is a table showing the surface numbers of the aspheric surfaces and aspheric coefficients of the aspheric surfaces of the imaging lens of Example 2.

The imaging lens of Example 2 comprises, in order from the object side along the optical axis Z, a first lens group G1 having positive refractive power, a second lens group G2 having negative refractive power, a third lens group G3 having negative refractive power, and a fourth lens group G4 having positive refractive power. The imaging lens of Example 2 is configured such that, during variable magnification from the wide angle end to the telephoto end, the first lens group G1 and the fourth lens group G4 are fixed in the optical axis direction with respect to the image plane Sim, the third lens group G3 moves to the image side in the optical axis Z, and the second lens group G2 moves in the optical axis direction so as to correct fluctuation of the image plane with the movement of the third lens group G3.

The imaging lens of Example 2 is configured such that the first lens group G1 comprises, in order from the object side, a first-a lens group G1a that is fixed with respect to the image plane Sim during focusing and has positive refractive power, and a first-b lens group G1b that moves during focusing and has positive refractive power, and only the first-b lens group is moved in the optical axis direction to perform focusing.

FIG. 28 is a diagram of respective aberrations of the imaging lens of Example 2.

(A) to (D) of FIG. 28 show spherical aberration, astigmatism, distortion, and lateral chromatic aberration of the imaging lens of Example 2 at the wide angle end.

(E) to (H) of FIG. 28 show spherical aberration, astigmatism, distortion, and lateral chromatic aberration of the imaging lens of Example 2 in the middle focal length state.

(I) to (L) of FIG. 28 show spherical aberration, astigmatism, distortion, and lateral chromatic aberration of the imaging lens of Example 2 at the telephoto end.

All of the aberration diagrams are aberration diagrams in a case where the object at infinity is brought into focus.

Example 3

Various kinds of data of the imaging lens of Example 3 are shown in FIGS. 29 to 32.

Similarly to the imaging lens of Example 1 described above, in the tables shown in FIGS. 29 to 32, numerical values are rounded to a predetermined digit. In data of the tables shown in FIGS. 29 to 32, "degree" is used as the unit of angle, and "mm" is used as the unit of length. Note that other appropriate units may be used since optical systems are usable even though the optical systems are proportionally magnified or proportionally reduced.

FIG. 29 is a table showing basic lens data in a case where the imaging lens of Example 3 is focused on the object at infinity.

FIG. 30 is a table showing specifications of the imaging lens of Example 3 at the wide angle end, the middle focal length state, and the telephoto end.

FIG. 31 is a table showing zoom distances of the imaging lens of Example 3 at the wide angle end, the middle focal length state, and the telephoto end.

FIG. 32 is a table showing the surface numbers of the aspheric surfaces and aspheric coefficients of the aspheric surfaces of the imaging lens of Example 3.

The imaging lens of Example 3 is a zoom lens having a five-group configuration that consists of, in order from the object side along the optical axis Z, a first lens group G1 that is fixed during variable magnification and has positive refractive power, a second lens group G2 that moves during variable magnification and has negative refractive power, a third lens group G3 that moves during variable magnification and has positive refractive power, a fourth lens group G4 that moves during variable magnification and has negative refractive power, and a fifth lens group (final lens group) G5 that is fixed during variable magnification and has positive refractive power.

The imaging lens of Example 3 is configured such that the first lens group G1 comprises, in order from the object side, three lens groups of a first-a lens group G1a that has negative refractive power and consists of, in order from the object side, two negative lenses and one positive lens, a first-b lens group G1b having positive refractive power, and a first lens group rear group G1c having positive refractive power, and only the first-b lens group G1b is moved in the optical axis direction to perform focusing.

FIG. 33 is a diagram of respective aberrations of the imaging lens of Example 3.

(A) to (D) of FIG. 33 show spherical aberration, astigmatism, distortion, and lateral chromatic aberration of the imaging lens of Example 3 at the wide angle end.

(E) to (H) of FIG. 33 show spherical aberration, astigmatism, distortion, and lateral chromatic aberration of the imaging lens of Example 3 in the middle focal length state.

(I) to (L) of FIG. 33 show spherical aberration, astigmatism, distortion, and lateral chromatic aberration of the imaging lens of Example 3 at the telephoto end.

All of the aberration diagrams are aberration diagrams in a case where the object at infinity is brought into focus.

[Effects on Lens Design with Application of the Invention]

FIG. 34 is a table showing effects in lens design with application of the invention in comparison with an imaging lens with no application of the invention.

In the table shown in FIG. 34, a "lens configuration" shows power arrangement of a first lens group as a focusing lens group, a second lens group and a third lens group as a zoom lens group, and a fourth lens group as a final lens group. "P" in the table indicates positive refractive power, and "−" indicates negative refractive power.

A "first lens group configuration" shows power arrangement of lens groups composing the first lens group. "Positive" in the table indicates positive refractive power, and "negative" indicates negative refractive power.

A "weight" shows comparison of the weight of the whole imaging lens. Here, a case where the weight is relatively heavy is evaluated as "BAD", and a case where the weight is light is evaluated as "GOOD".

"Design distance performance" shows comparison of resolution performance to a certain subject distance. The resolution performance to the certain subject distance indicates resolution performance to a certain focus position. Here, a case the resolution performance is relatively bad is evaluated as "BAD", a case the resolution performance is good is evaluated as "GOOD", and a case the resolution performance is particularly good is evaluated as "VERY GOOD".

"Distance fluctuation" shows comparison of change in optical performance with change in subject distance. The change in optical performance with the change in subject distance indicates change in optical performance with change in focus position. Here, a case where the change is relatively large is evaluated as "BAD", and a case where the change is relatively small is evaluated as "GOOD".

A "focus breathing amount" shows comparison of the fluctuation of the angle of view in a case where the focus position is changed from the infinity to the minimum object distance (M.O.D.). Here, a case where the fluctuation of the angle of view is large is evaluated as "BAD", and a case where the fluctuation of the angle of view is small is evaluated as "GOOD". In Examples 1 to 3, a "design value" indicates a focus breathing amount in design, and "application of the invention" indicates a focus breathing amount in a case where the invention is applied. That is, "application of the invention" indicates a focus breathing amount in a case where focus breathing is corrected through the image processing.

Comparative Example 1 is an imaging lens having the same lens configuration as in Example 1, and Comparative Example 2 is an imaging lens having the same lens configuration as in Example 2.

In Comparative Example 1, while the focus breathing amount is small originally, as in Example 1, focus breathing correction through the image processing is assumed, whereby power used to suppress focus breathing can be used for correction of other aberrations. For this reason, in Example 1, performance capable of coping with imaging of high pixels is improved while satisfying requirements of focus breathing performance. Specifically, it is possible to improve the design distance performance. The same applies to Example 3, and focus breathing correction through the image processing is assumed, whereby power used to suppress focus breathing can be used for correction of other aberrations. For this reason, it is possible to improve performance (for example, design distance performance) capable of coping with imaging of high pixels while satisfying requirements of focus breathing performance.

In Comparative Example 2, it is possible to simplify the configuration of the first lens group compared to Comparative Example 1. With this, it is possible to achieve lightweight and compactness. On the other hand, in Comparative Example 2, the focus breathing amount increases. In Example 2, this problem can be solved.

EXPLANATION OF REFERENCES

1: imaging apparatus
10A: imaging lens
10B: imaging lens
10C: imaging lens
20: focusing lens drive unit
22: focusing lens position detection unit
24: variator lens drive unit
26: variator lens position detection unit
28: compensator lens drive unit
30: compensator lens position detection unit
32: stop drive unit
40: lens control unit
100: imaging apparatus body
110: image sensor
120: signal processing unit
120A: analog signal processing unit
120B: source image data generation unit
120C: angle-of-view correction unit
120D: angle-of-view correction information storage unit
120E: image output unit
130: image display unit
132: image output terminal
134: operating unit
140: imaging apparatus body control unit
140A: lens information acquisition unit
140B: image sensor size information acquisition unit
140C: area setting unit 140D: focus position information acquisition unit
140E: focal length information acquisition unit
G1: first lens group
G1a: first-a lens group
G1b: first-b lens group
G1c: first lens group rear group
G2: second lens group
G3: third lens group
G4: fourth lens group
G4a: fourth-a lens group
G4b: fourth-b lens group
G4b1: fourth-b1 lens group
G4b2: fourth-b2 lens group
L11: lens
L110: lens
L111: lens
L12: lens
L13: lens
L14: lens
L15: lens
L16: lens
L17: lens
L18: lens
L19: lens
L21: lens
L22: lens
L23: lens
L24: lens
L31: lens
L32: lens
L33: lens
L34: lens
L41: lens
L42: lens
L43: lens
L44: lens
L45: lens
L46: lens
L47: lens
L48: lens
L49: lens
L50: lens
L51: lens
Sim: image plane
St: aperture stop
PP: optical member
PP1: optical member
PP2: optical member
Bea: bar indicating fluctuation range of angle of view
Boa: bar indicating fluctuation range of angle of view
EA: effective area
EPA: effective pixel area
OA: output area
S1 to S6: procedure of setting processing of effective area and output area
S10 to S15: procedure of correction processing of focus breathing to be executed during imaging
X: reference angle of view

What is claimed is:

1. An imaging apparatus comprising:
a zoom lens comprising, in order from an object side, a first lens group that is fixed during variable magnification, a plurality of movable lens groups that move during variable magnification, and a final lens group that is fixed during variable magnification, the first lens group comprising, in order from the object side, a first-a lens group that is fixed during focusing and a first-b lens group that moves during focusing, and a lens control processor;
an image sensor that captures an image formed by the zoom lens, and
a signal processing processor,
wherein the signal processing processor is configured to
process a signal output from the image sensor to generate source image data, the signal being output from an effective area set as an area where a normal image is to be captured;
extract and output image data of an output area set within the effective area from the source image data; and
subject the source image data to magnification and reduction processing to correct an angle of view of the image data of the output area, and in a case where the angle of view of the image data of the output area fluctuates with focusing, subjects the source image data to the magnification and reduction processing in conjunction with focusing and corrects the angle of view of the image data of the output area to a reference angle of view determined for each focal length,
wherein the lens control processor included in the zoom lens is configured to
acquire information regarding a size of the image sensor from an imaging apparatus body in which the zoom lens is mounted, and
set the effective area and the output area based on information regarding a size of an image circle of the zoom lens and information regarding the size of the image sensor.

2. The imaging apparatus according to claim 1,
wherein the reference angle of view is set to a minimum angle of view out of the angle of view of the image data of the output area fluctuating with focusing at each focal length, and
the lens control processor corrects the angle of view of the image data of the output area through magnification processing.

3. The imaging apparatus according to claim 1,
wherein the reference angle of view is set to a maximum angle of view out of the angle of view of the image data of the output area fluctuating with focusing at each focal length, and
the lens control processor corrects the angle of view of the image data of the output area through reduction processing.

4. The imaging apparatus according to claim 1,
wherein the reference angle of view is set to a minimum angle of view out of the angle of view of the effective area fluctuating with focusing at each focal length, and
the lens control processor corrects the angle of view of the image data of the output area through reduction processing in a case where the angle of view of the image data of the output area is reduced smaller than the reference angle of view with focusing, and corrects the angle of view of the image data of the output area through magnification processing in a case where the angle of view of the image data of the output area is magnified greater than the reference angle of view with focusing.

5. A signal processing method for an imaging apparatus, wherein the imaging apparatus comprises a zoom lens comprising, in order from an object side, a first lens group that is fixed during variable magnification, a plurality of movable lens groups that move during variable magnification, and a final lens group that is fixed during variable magnification, the first lens group comprising, in order from the object side, a first-a lens group that is fixed during focusing and a first-b lens group that moves during focusing, and a lens control processor, the imaging apparatus further comprising an image sensor that captures an image formed by the zoom lens, and a signal processing processor, the signal processing method comprises:
- a step of processing a signal output from the image sensor to generate source image data, the signal being output from an effective area set as an area where a normal image is to be captured;
- a step of extracting and outputting image data of an output area set within the effective area from the source image data;
- a step of subjecting the source image data to magnification and reduction processing to correct an angle of view of the image data of the output area, and in a case where the angle of view of the image data of the output area fluctuates with focusing, subjecting the source image data to the magnification and reduction processing in conjunction with focusing and correcting the angle of view of the image data of the output area to a reference angle of view determined for each focal length;
- a step of acquiring, via the lens control processor, information regarding a size of the image sensor from an imaging apparatus body in which the zoom lens is mounted; and
- a step of setting, via the lens control processor, the effective area and the output area based on information regarding a size of an image circle of the zoom lens and information regarding the size of the image sensor.

6. A non-transitory computer readable recording medium storing a signal processing program for an imaging apparatus, wherein the imaging apparatus comprises a zoom lens comprising, in order from an object side, a first lens group that is fixed during variable magnification, a plurality of movable lens groups that move during variable magnification, and a final lens group that is fixed during variable magnification, the first lens group comprising, in order from the object side, a first-a lens group that is fixed during focusing and a first-b lens group that moves during focusing, and a lens control processor, the imaging apparatus further comprising an image sensor that captures an image formed by the zoom lens, and a signal processing processor, the signal processing program causes a computer to implement
- a function of processing a signal output from the image sensor to generate source image data, the signal being output from an effective area set as an area where a normal image is to be captured;
- a function of extracting and outputting image data of an output area set within the effective area from the source image data;
- a function of subjecting the source image data to magnification and reduction processing to correct an angle of view of the image data of the output area, and in a case where the angle of view of the image data of the output area fluctuates with focusing, subjecting the source image data to the magnification and reduction processing in conjunction with focusing and correcting the angle of view of the image data of the output area to a reference angle of view determined for each focal length;
- a function of acquiring, via the lens control processor, information regarding a size of the image sensor from an imaging apparatus body in which the zoom lens is mounted; and
- a function of setting, via the lens control processor, the effective area and the output area based on information regarding a size of an image circle of the zoom lens and information regarding the size of the image sensor.

* * * * *